(12) United States Patent
Pampinella et al.

(10) Patent No.: US 7,325,442 B1
(45) Date of Patent: Feb. 5, 2008

(54) LEAK TESTING DEVICE WITH A PERMANENT COUPLING

(75) Inventors: Joseph A. Pampinella, Reston, VA (US); Brandon Ming-Yung Chi, Diamond Bar, CA (US)

(73) Assignee: Inflow Products, Ltd., Diamond Bar, CA (US)

( * ) Notice: Subject to any disclaimer, the term of this patent is extended or adjusted under 35 U.S.C. 154(b) by 0 days.

(21) Appl. No.: 11/526,621

(22) Filed: Sep. 26, 2006

Related U.S. Application Data

(63) Continuation of application No. 11/483,569, filed on Jul. 11, 2006, now abandoned, which is a continuation-in-part of application No. 10/742,829, filed on Dec. 23, 2003, which is a continuation-in-part of application No. 10/151,893, filed on May 22, 2002, now Pat. No. 6,672,139, which is a continuation-in-part of application No. 09/845,217, filed on May 1, 2001, now Pat. No. 6,422,064, which is a continuation-in-part of application No. 09/340,438, filed on Jun. 28, 1999, now Pat. No. 6,234,007.

(51) Int. Cl.
*G01M 3/04* (2006.01)
*F16K 3/02* (2006.01)
*F16K 35/00* (2006.01)

(52) U.S. Cl. ............... 73/49.8; 73/49.1; 73/40.5 R; 138/89; 138/90; 138/94; 251/319; 285/80

(58) Field of Classification Search ........... 73/40.5 R, 73/49.1, 49.8; 285/80, 93; 251/319; 138/89, 138/90, 94
See application file for complete search history.

(56) References Cited

U.S. PATENT DOCUMENTS

| 1,133,714 A | 3/1915 | Elder |
| 1,928,316 A | 9/1933 | Muto |
| 2,463,235 A | 3/1949 | Andrews |
| 2,823,887 A | 2/1958 | Osinski |

(Continued)

FOREIGN PATENT DOCUMENTS

WO       WO 01/01101       1/2001

OTHER PUBLICATIONS

U.S. Appl. No. 29/260,102, filed May 19, 2006.

(Continued)

*Primary Examiner*—Daniel S. Larkin
(74) *Attorney, Agent, or Firm*—Dinesh Agarwal, P.C.

(57) ABSTRACT

A leak testing device to be positioned adjacent one or more conduits comprises a generally cylindrical body defining a recess therein and including first and second end portions for cooperating with an end portion of a conduit. The body includes an opening between the first and second end portions. A sealing door or a test door is selectively positioned in the opening. A diaphragm member including a through hole is provided to be positioned within the body. A valve is operably connected to the diaphragm member for selectively opening or closing the through hole to thereby permit or restrict the flow of a fluid therethrough. A window for viewing the interior of the body for troubleshooting, diagnosis, etc., may optionally be provided. The opening in the body receives the diaphragm member and the test door when leak-testing a conduit, or the sealing door when connecting one or more conduits in a fluid communication.

39 Claims, 16 Drawing Sheets

U.S. PATENT DOCUMENTS

| | | | |
|---|---|---|---|
| 2,953,015 A | 9/1960 | Carrie |
| 3,232,577 A | 2/1966 | Sargent |
| 3,489,441 A | 1/1970 | Malcolm |
| 3,737,180 A | 6/1973 | Hayes, Jr. et al. |
| 3,770,301 A | 11/1973 | Adams |
| 3,860,038 A | 1/1975 | Forni |
| 3,941,349 A | 3/1976 | Pierson |
| 3,945,604 A | 3/1976 | Clarkson |
| 3,999,785 A | 12/1976 | Blakeley |
| 4,019,371 A | 4/1977 | Chaplin et al. |
| 4,112,969 A | 9/1978 | Still |
| 4,124,231 A | 11/1978 | Ahlstone |
| 4,176,756 A | 12/1979 | Gellman |
| 4,194,721 A | 3/1980 | Nachtigahl |
| D262,133 S | 12/1981 | Fain |
| 4,407,171 A | 10/1983 | Hasha et al. |
| 4,429,568 A | 2/1984 | Sullivan |
| 4,492,391 A | 1/1985 | Haines |
| 4,602,504 A | 7/1986 | Barber |
| 4,763,510 A | 8/1988 | Palmer |
| 4,789,189 A | 12/1988 | Robertson |
| 4,795,197 A | 1/1989 | Kaminski et al. |
| 4,819,974 A | 4/1989 | Zeidler |
| 4,895,181 A | 1/1990 | McKavanagh |
| 5,018,768 A | 5/1991 | Palatchy |
| 5,076,095 A | 12/1991 | Erhardt |
| 5,131,697 A | 7/1992 | Shumway |
| 5,197,324 A | 3/1993 | Keys |
| 5,269,568 A | 12/1993 | Courturier |
| 5,287,730 A | 2/1994 | Condon |
| 5,385,373 A | 1/1995 | Love |
| 5,707,089 A | 1/1998 | Fend |
| 5,782,499 A | 7/1998 | Gfrerer et al. |
| 6,000,278 A | 12/1999 | Hystad |
| D430,482 S | 9/2000 | Stout, Jr. |
| 6,131,441 A | 10/2000 | Berube et al. |
| 6,234,007 B1 | 5/2001 | Pampinella |
| 6,299,216 B1 | 10/2001 | Thompson |
| D451,984 S | 12/2001 | Tigerholm |
| 6,422,064 B1 | 7/2002 | Pampinella |
| D481,110 S | 10/2003 | Snyder, Sr. et al. |
| D483,441 S | 12/2003 | Dole et al. |
| 6,655,413 B2 | 12/2003 | Condon et al. |
| 6,672,139 B2 | 1/2004 | Pampinella |
| D488,852 S | 4/2004 | Pampinella |
| 6,997,041 B1 | 2/2006 | Metzger et al. |
| D516,686 S | 3/2006 | Wilk, Jr. et al. |
| D517,665 S | 3/2006 | Wilk, Jr. et al. |
| 2001/0015092 A1 | 8/2001 | Pampinella |
| 2002/0023482 A1 | 2/2002 | Pampinella |
| 2002/0140222 A1 | 10/2002 | Pampinella |
| 2004/0134260 A1 | 7/2004 | Pampinella et al. |
| 2004/0134261 A1 | 7/2004 | Pampinella |
| 2005/0001425 A1 | 1/2005 | deCler et al. |
| 2005/0146133 A1 | 7/2005 | Snyder, Sr. et al. |

OTHER PUBLICATIONS

U.S. Appl. No. 29/260,103, filed May 19, 2006.

The Jay R. Smith Co. "The Boss Tee", The Jay R. Smith Mfg. Co. Cleanout and Test Tee, Fig. No. 4505 (2 pages).

Letter from Stetina Brunda Garred & Brucker law firm dated Mar. 27, 2007 (2 pp.) with enclosures, including Hubbard license dated Jun. 1, 2006 (3 pp.), Comparison of Claims in U.S. Appl. No. 10/742,829, (As of Mar. 1, 2007) to the Disclosure of Patent 6,997,041 (28 pp.) and Comparison of Claims in U.S. Appl. No. 10/742,829, (As of Mar. 1, 2007) to Applicant's Snake-Eye Fitting That Admittedly Infringes Prior Art Patent No. 6,997,041, (38 pp.).

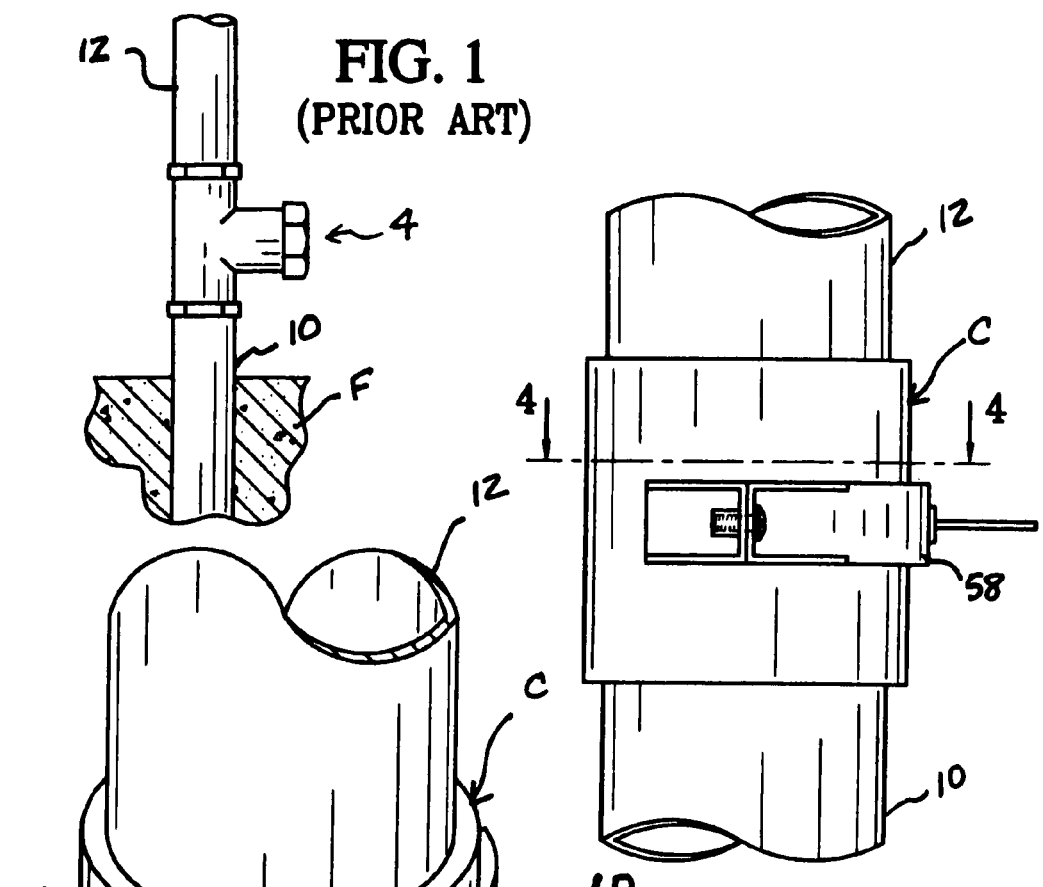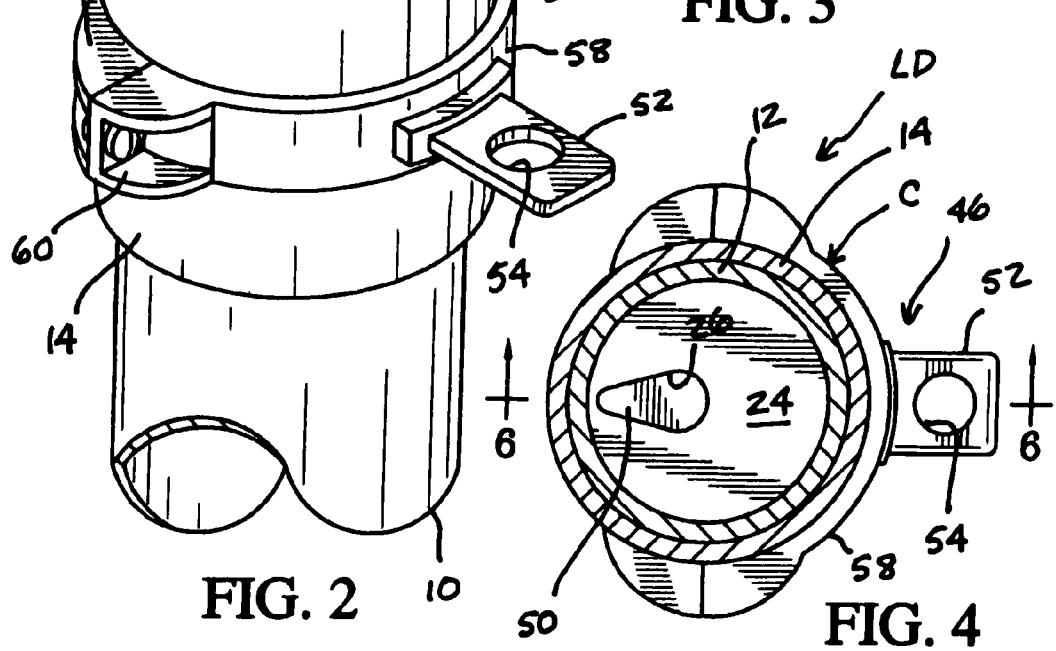

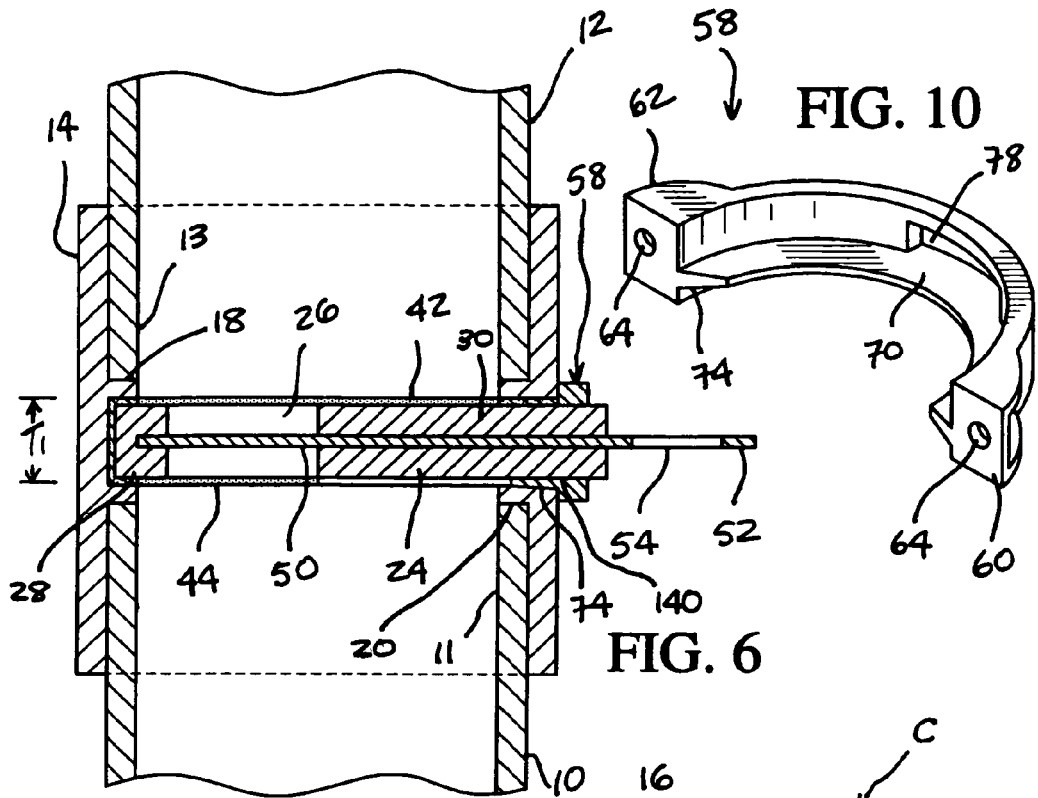
FIG. 10
FIG. 6
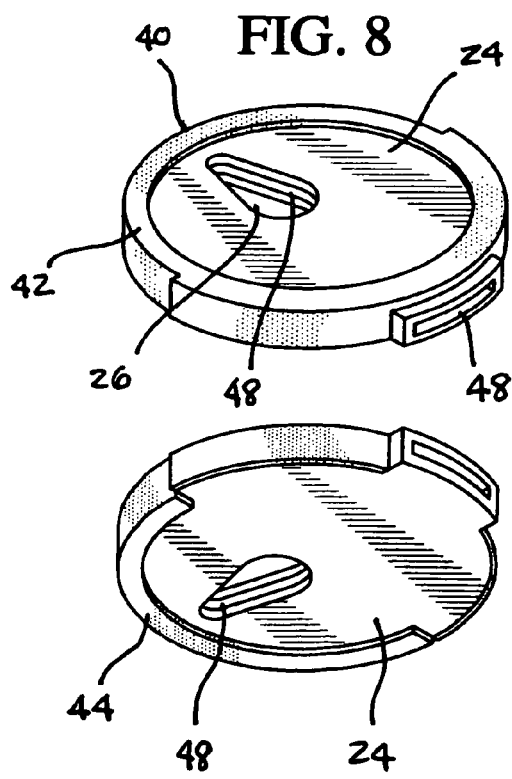
FIG. 8
FIG. 9
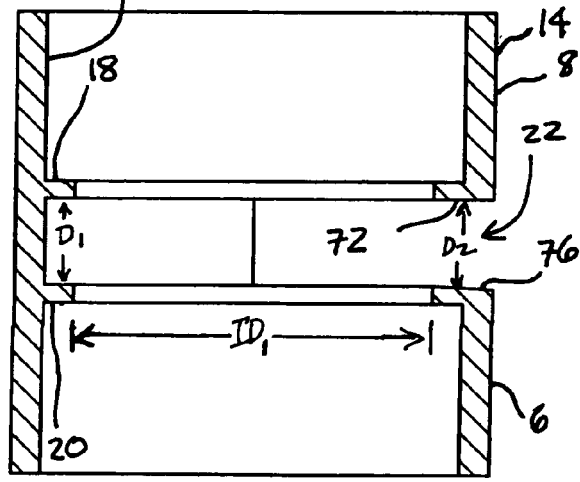
FIG. 11

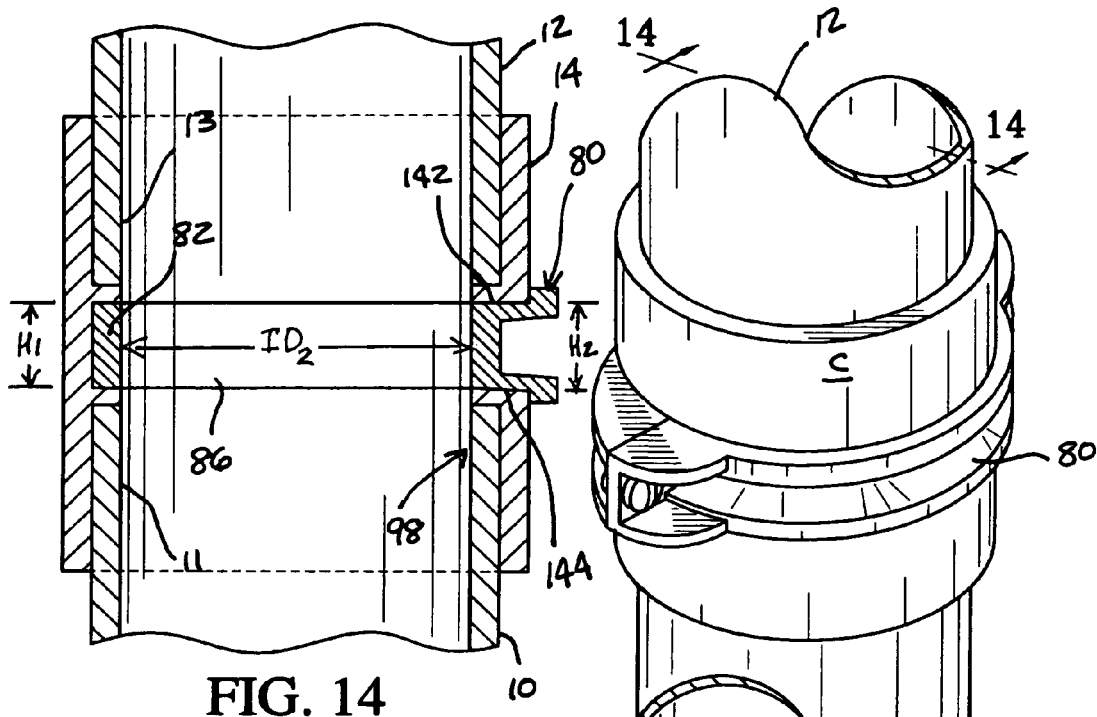
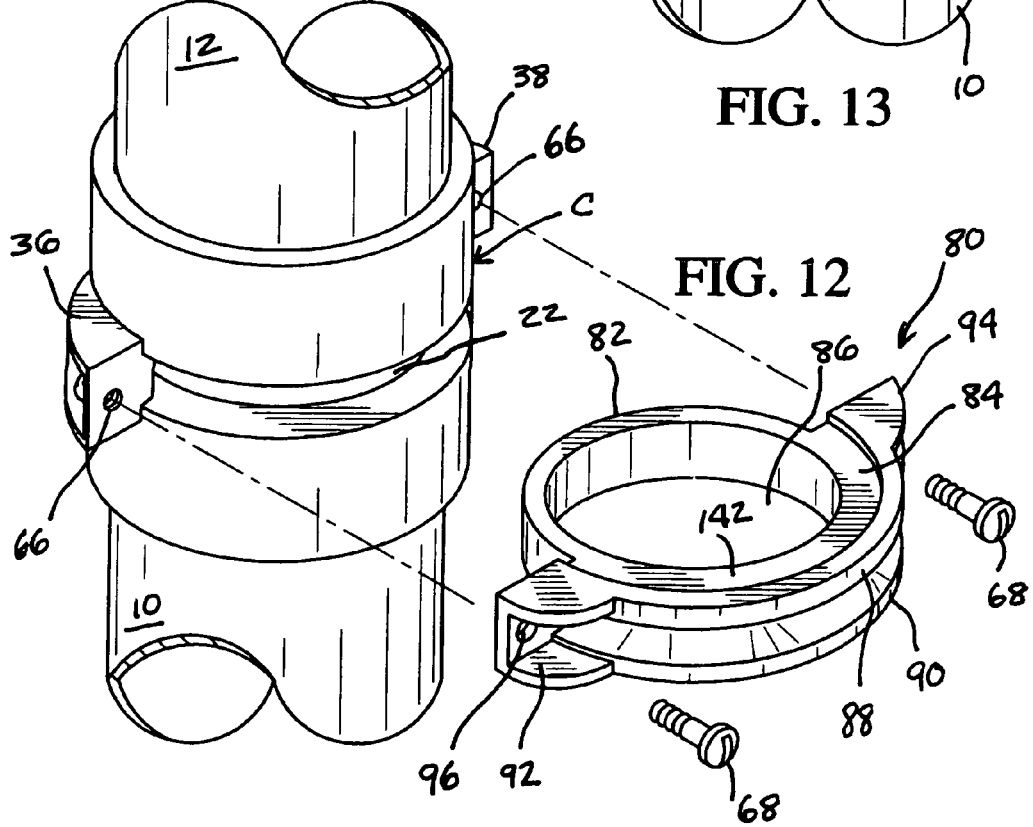
FIG. 14
FIG. 13
FIG. 12

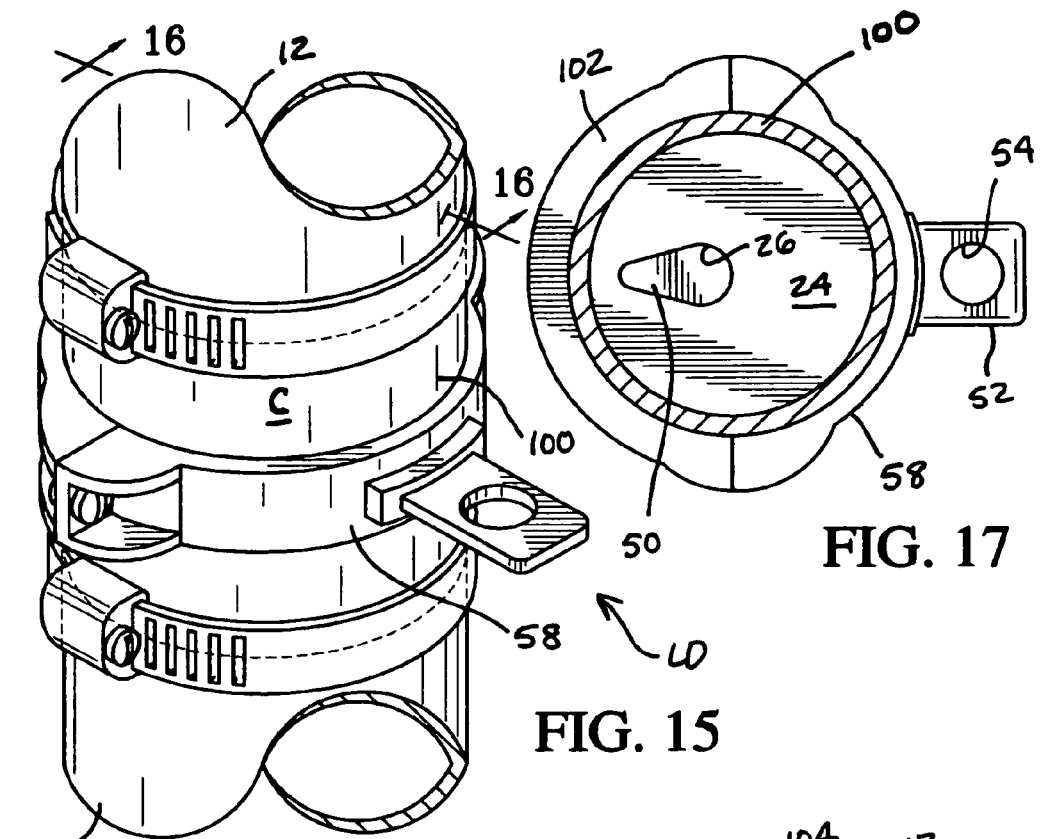
FIG. 15
FIG. 17
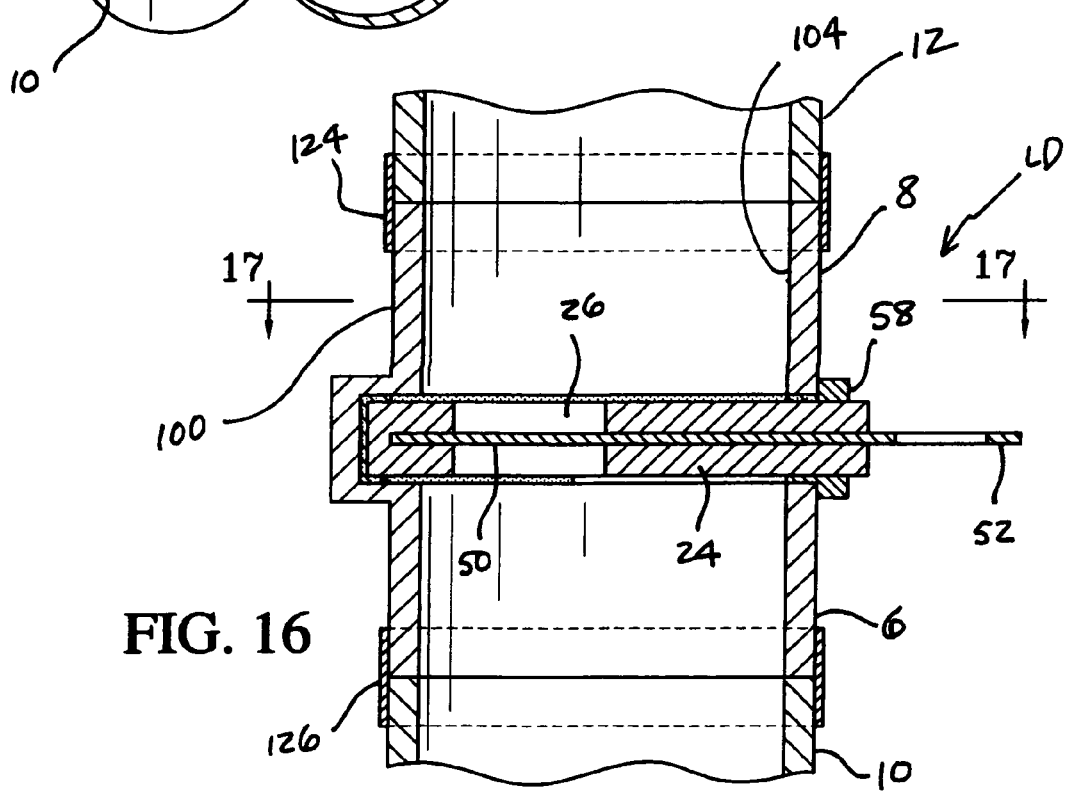
FIG. 16

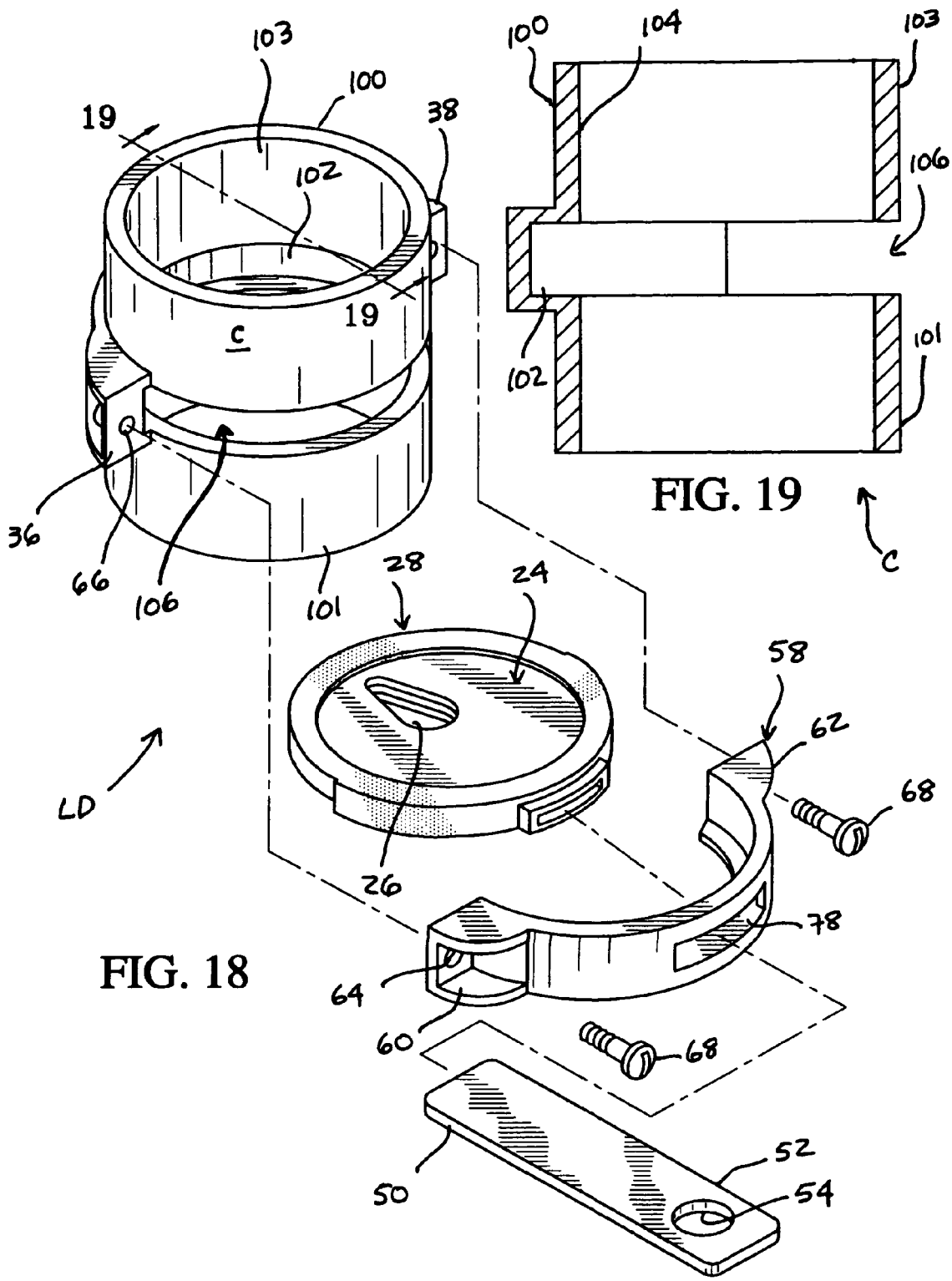

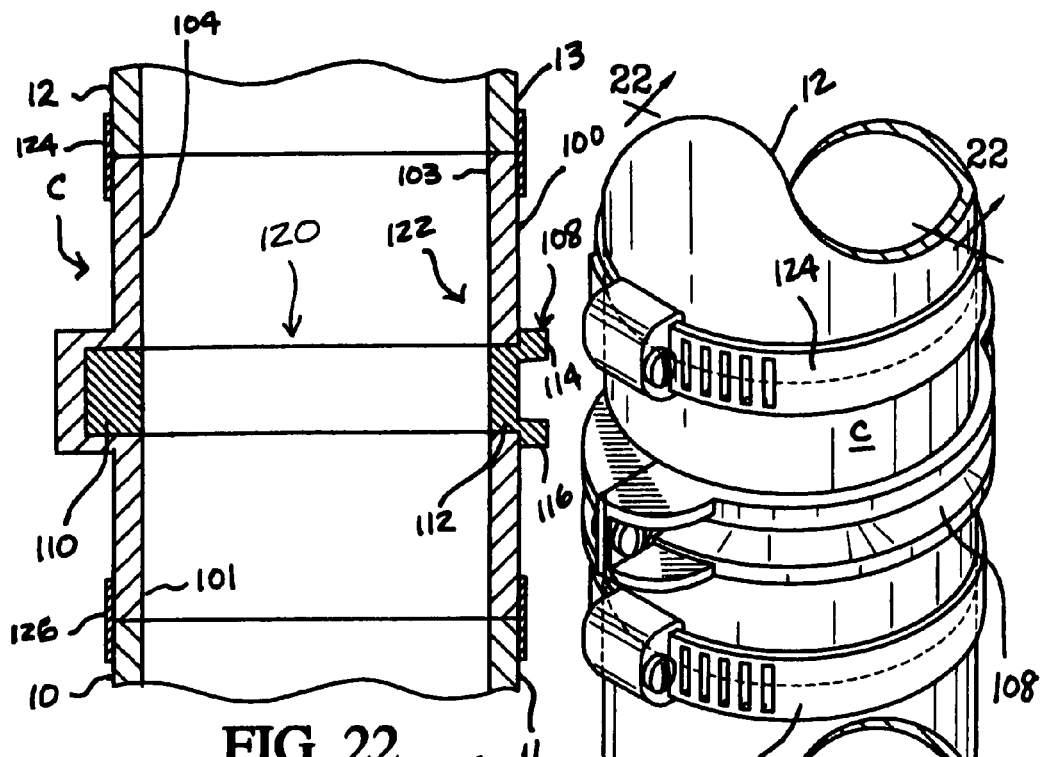
FIG. 22
FIG. 21
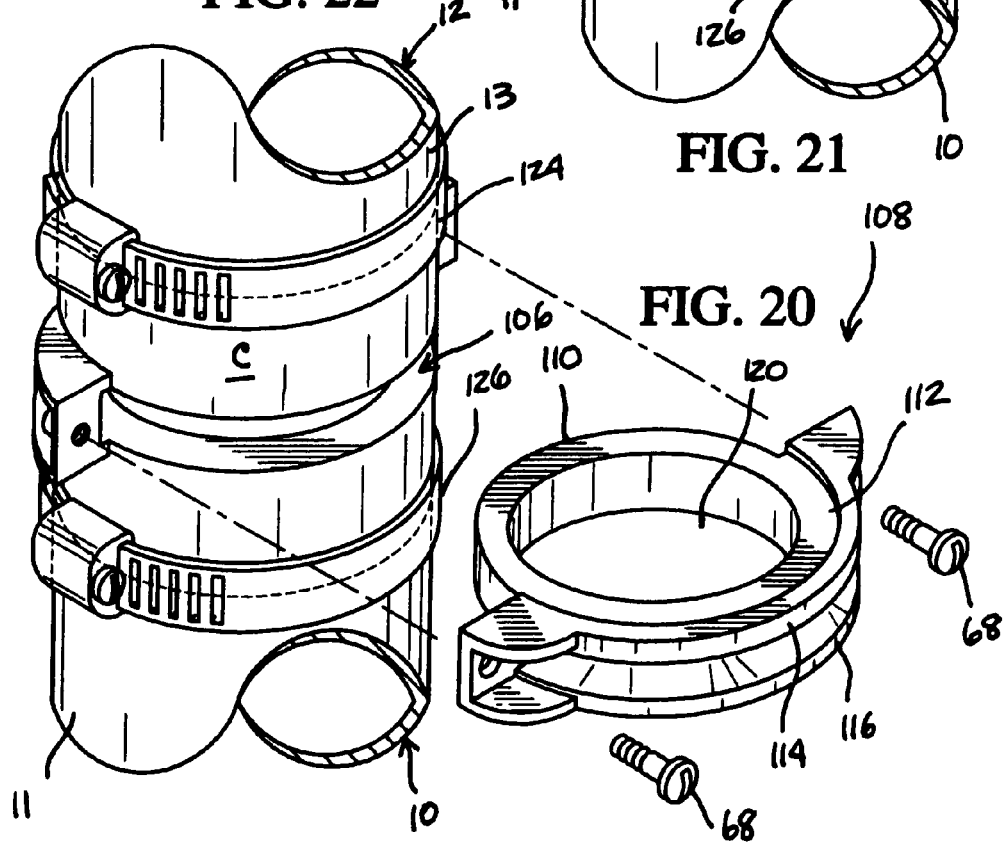
FIG. 20

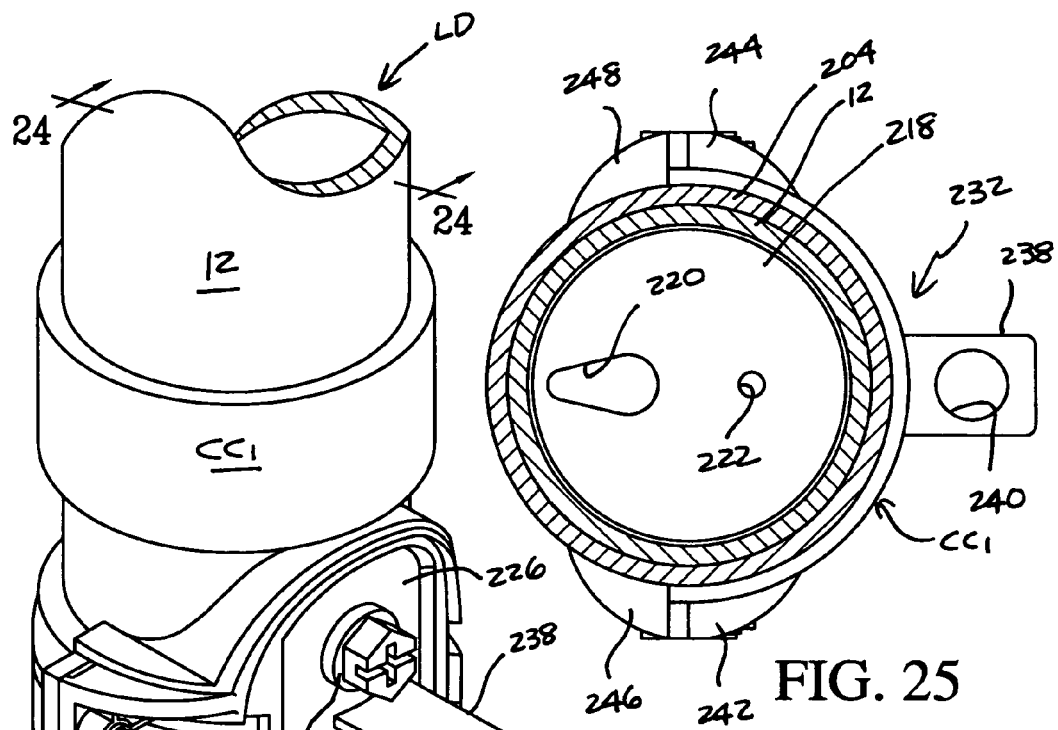
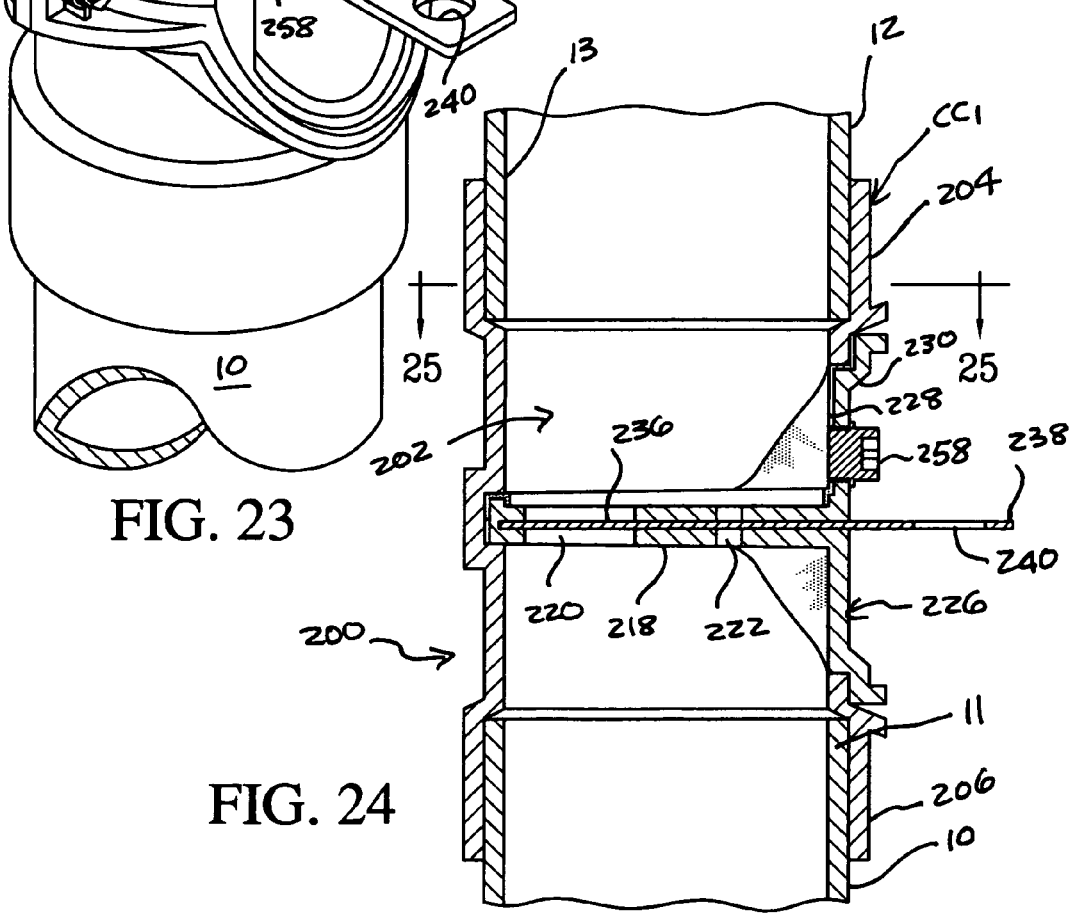
FIG. 23
FIG. 24
FIG. 25

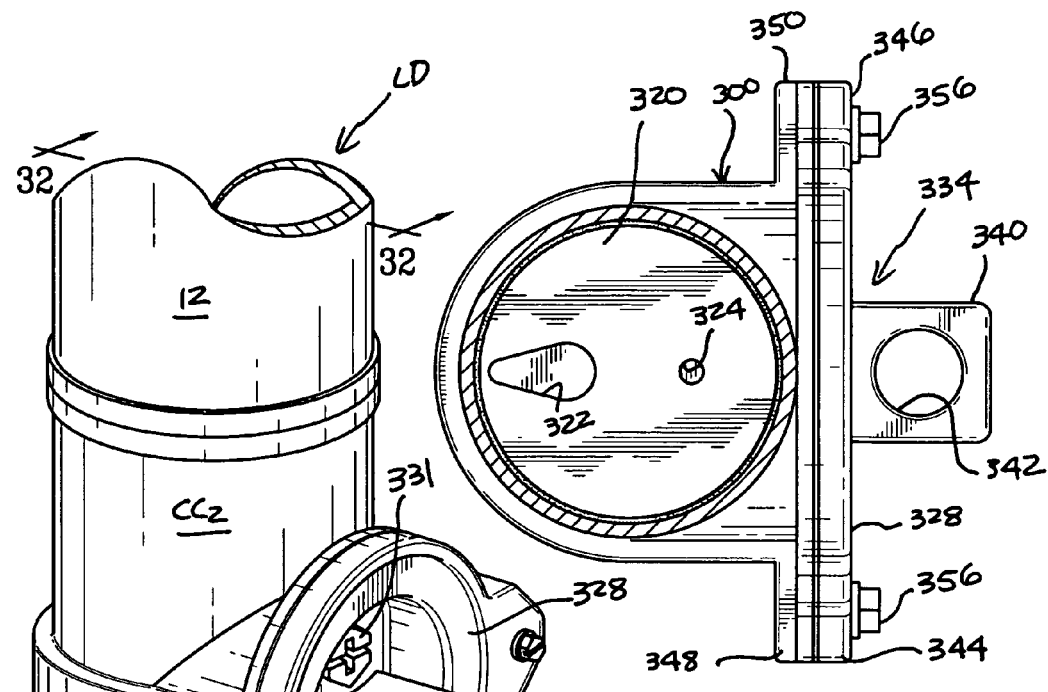
FIG. 33
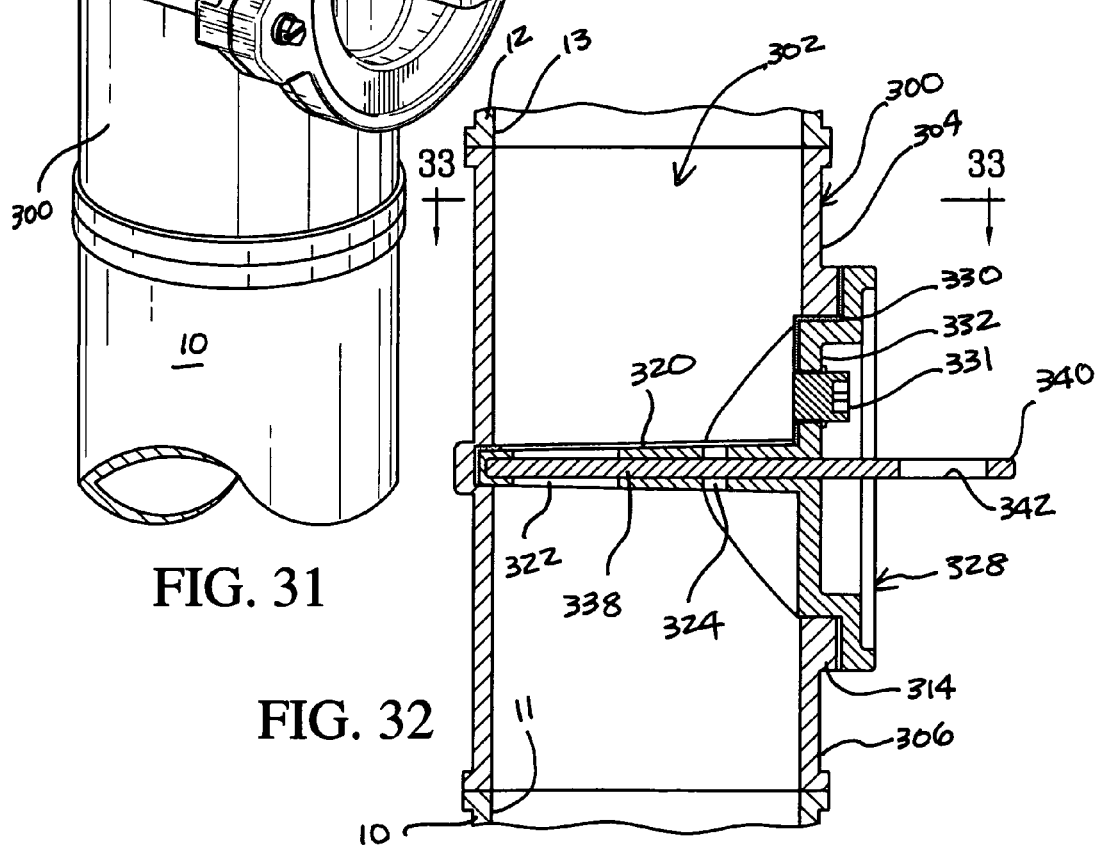
FIG. 31
FIG. 32

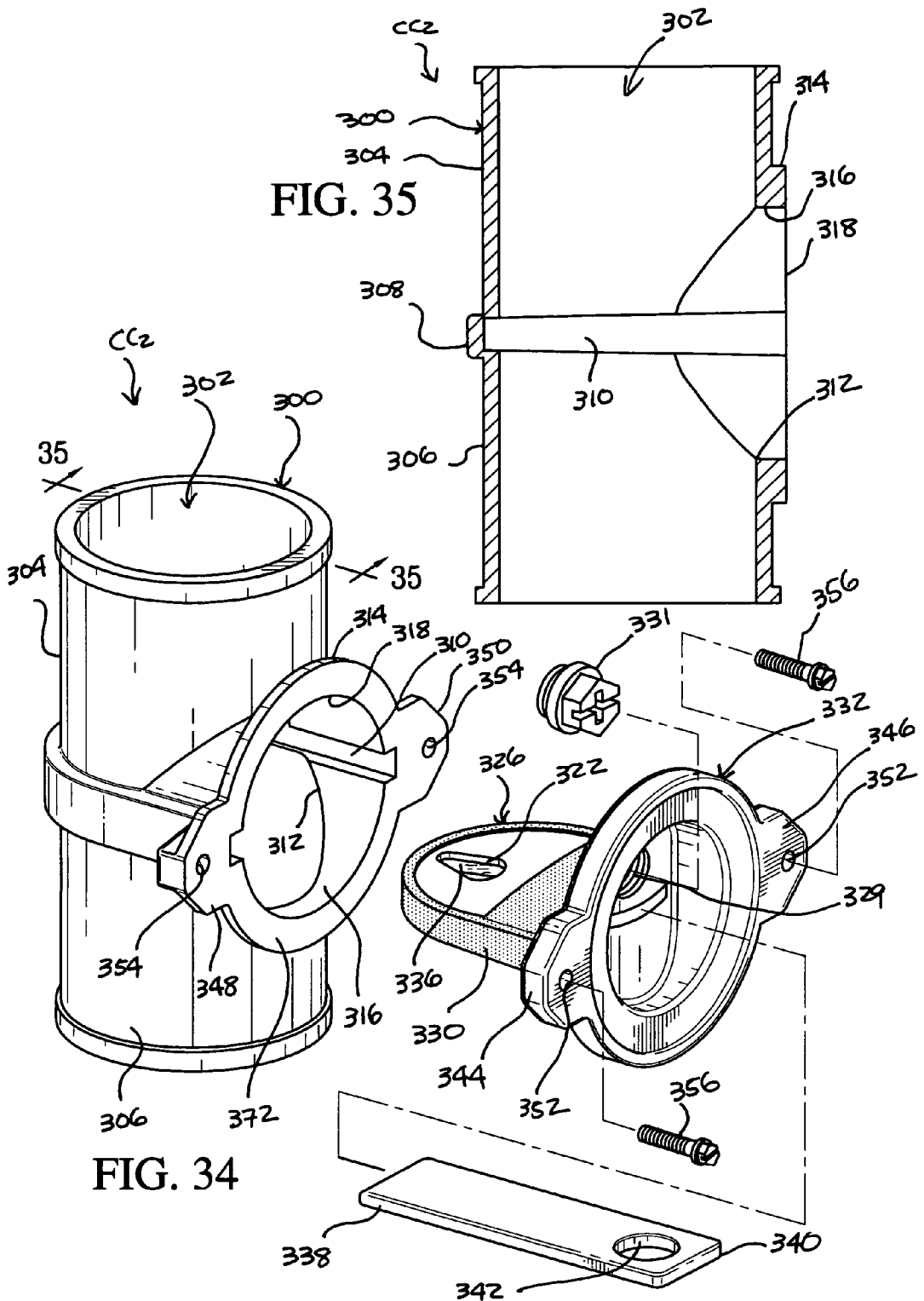

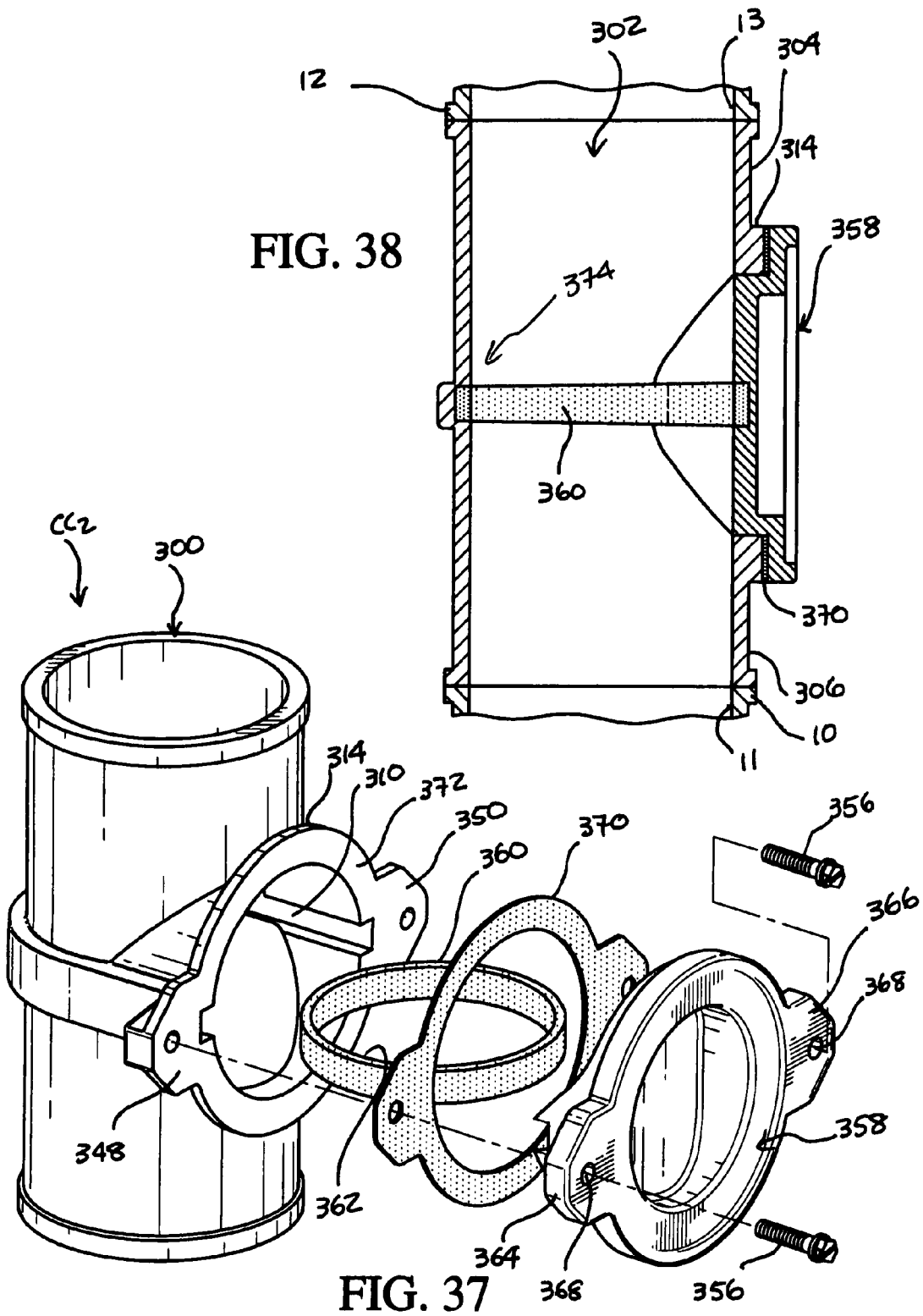

LEAK TESTING DEVICE WITH A PERMANENT COUPLING

This is a continuation of application Ser. No. 11/483,569, filed Jul. 11, 2006, now abandoned, which is a continuation-in-part of application Ser. No. 10/742,829, filed Dec. 23, 2003, which is a continuation-in-part of application Ser. No. 10/151,893, filed on May 22, 2002 (now U.S. Pat. No. 6,672,139), which is a continuation-in-part of application Ser. No. 09/845,217, filed on May 1, 2001 (now U.S. Pat. No. 6,422,064), which is a continuation-in-part of application Ser. No. 09/340,438, filed on Jun. 28, 1999 (now U.S. Pat. No. 6,234,007), all incorporated herein in their entirety by reference.

BACKGROUND OF THE INVENTION

The present invention is generally directed to a leak testing device, and more particularly to a leak testing device with a permanent coupling which can be positioned between two adjacent conduits, or adjacent an end of a single conduit.

In the plumbing industry, it is common to test pipes for leaks prior to use. In particular, in the installation of new plumbing systems in buildings, or the replacement of an existing pipe, the government regulations require that a pipe be leaked-tested prior to its use as part of the overall plumbing system. The current practice is to install a T-fitting between the new pipe and an existing adjacent pipe. The two arms of the T-fitting are vertically connected to the ends of the new and existing pipes with a conventional split-clamp assembly. The side-arm of the T-fitting includes a screw-on cap which can be removed for allowing access to the inside of the T (FIG. 1).

The testing procedure involves a plumbing professional to manually insert a pneumatically inflatable plug through the side-arm of the T-fitting and into the end opening of the new pipe. The plug is then inflated to seal-off the new pipe opening leading into the T-fitting. The new pipe, which in many instance extends to one or more floors of a building, is then filled with a fluid, typically water, and is left in this condition until a government official visually inspects the new pipe for any leaks. Upon completion of the inspection, the fluid from the new pipe must be discharged for final assembly of the plumbing system. The fluid discharge involves deflating the plug by actuating a valve located on the plug which is completely hidden inside the T-fitting. The access to the valve is typically gained through the side-arm of the T-fitting.

The current practice of deflating the plug and removing it from inside the T-fitting is not very desirable in that severe physical injury, including death, or property damage may result if the plug fails for any reason, or due to improper handling thereof. The inflation of the plug to a desired pressure of 30 PSI, and its deflation at the completion of the testing procedure, requires additional equipment and proper training of the associated technician. This procedure further involves the use of a T-fitting which adds to the overall expense of the testing procedure. Finally, in many instances, the inflatable plug weakens or gets damaged due to inflation and deflation and can not be reused.

In view of the above, there has been a need in the industry for a leak testing device which is safe for the plumbing professional and the surrounding property, inexpensive to manufacture, easy to use, and simple in construction. One of the co-inventors of the present invention, himself a plumbing professional for many years, responded to this long-felt need and filled the gap in the industry by devising safer leak testing devices disclosed in U.S. application Ser. Nos. 10/742,829, filed Dec. 23, 2003, 10/151,893, filed May 22, 2002 (now U.S. Pat. No. 6,672,139), 09/845,217, filed May 1, 2001 (now U.S. Pat. No. 6,422,064) and 09/340,438, filed Jun. 28, 1999 (now U.S. Pat. No. 6,234,007), the contents of all of which are incorporated herein by reference. He also found that conventional couplings were not very effective, cumbersome to use and therefore, not desirable. In particular, a conventional coupling includes a split-clamp and separate upper and lower metallic rings to be disposed about the periphery thereof. Proper positioning and subsequent tightening of the upper and lower rings requires extra time and skill that can be eliminated.

Examples of various valves, pipe testing devices and couplings are disclosed in U.S. Pat. Nos. 1,133,714; 1,928,316; 2,823,887; 2,953,015; 3,232,577; 3,737,180; 3,770,301; 3,941,349; 3,945,604; 4,019,371; 4,124,231; 4,176,756; 4,194,721; 4,407,171; 4,429,568; 4,602,504; 4,763,510; 4,795,197; 4,819,974; 4,895,181; 5,018,768; 5,076,095; 5,197,324; 5,269,568; 5,287,730; 5,385,373; 5,707,089; 5,782,499; 6,000,278; 6,131,441; 6,299,216; 6,234,007; 6,422,064; 6,655,413; 6,672,139; 6,997,041; Des. 262,133; Des. 430,482; Des. 451,984 S; Des. 488,852; 2001/0015092; 2002/0023482; 2002/0140222; 2004/0134260; 2004/0134261; and PCT International Publication WO 01/01101.

OBJECTS AND SUMMARY OF THE INVENTION

The principal object of the present invention is to provide a leak testing device with a permanent coupling which does not suffer from the disadvantages of the conventional devices.

An object of the present invention is to provide a conduit coupling which can be easily provided between two adjacent conduits, or adjacent an end of a single conduit.

Another object of the present invention is to provide a coupling for connecting one or more conduits in a fluid communication. The coupling includes a window for viewing the interior thereof for troubleshooting, diagnosis, etc.

Another object of the present invention is to provide a leak testing device to be positioned adjacent one or more conduits.

Another object of the present invention is to provide a permanent coupling for connecting two adjacent conduits in a fluid communication.

Yet another object of the present invention is to provide a leak testing device with a permanent coupling which can be easily provided between two adjacent conduits, or adjacent an end of a single conduit.

Still yet another object of the present invention is to provide a leak testing device with a permanent coupling which is safe to use in that it does not threaten physical injury to the plumbing professional, property damage, or damage to others.

An additional object of the present invention is to provide a leak testing device with a permanent coupling which eliminates the use of a T-fitting.

Yet an additional object of the present invention is to provide a leak testing device with a permanent coupling which does not require additional equipment, such as a pneumatic pump or the like for inflation and deflation purposes.

A further object of the present invention is to provide a leak testing device with a permanent coupling which is simple in construction and inexpensive to manufacture, and wherein the leak testing components, including a diaphragm with its associated parts, are reusable. In other words, after leak testing a conduit, the coupling is left in place attached to the conduit(s) for flowing a fluid therethrough, while the diaphragm and its associated components are removed and may be reused with another coupling for leak-testing another conduit.

Yet a further object of the present invention is to provide a conduit coupling for use in connection with one or more conduits, which is versatile in that it can used with the leak testing components to leak-test a conduit, and then left in place to be used as a permanent coupling for connecting two adjacent conduits in a fluid communication subsequent to the test. In other words, the conduit coupling of the present invention is first used to leak-test a conduit in conjunction with the leak testing components, and then is left mounted at the end of a single conduit, or between two adjacent conduits for connecting the conduits in a fluid communication. In this manner, the conduit coupling functions as a permanent coupling for connecting two adjacent conduits in a fluid communication.

In summary, the main object of the present invention is to provide a leak testing device with a coupling, which can be easily installed between two adjacent conduits, or adjacent an end of a conduit. The device is simple in construction, easy to use, and does not pose danger of bodily harm to the plumbing professional and associated personnel or risk of property damage, and is inexpensive to manufacture. The coupling functions as a permanent coupling for connecting two adjacent conduits in a fluid communication, while the leak testing components are reusable.

One of the above objects is met, in part, by the present invention which in one aspect includes a coupling for connecting two adjacent conduits in a fluid communication, which comprises a generally cylindrical body defining a recess therethrough and including first and second end portions for cooperating with the respective end portions of two adjacent conduits. The body includes an opening between the first and second end portions for receiving a sealing door. The sealing door includes a through hole having a diameter generally corresponding to the internal diameter of the end portion of one of the conduits.

Another aspect of the present invention includes a coupling for connecting two adjacent conduits in a fluid communication, which comprises a generally cylindrical body defining a recess therethrough and including first and second end portions for cooperating with the respective end portions of two adjacent conduits. The body includes an opening between the first and second portions which is in communication with the recess. A sealing door including a through hole and a sealing portion is provided to be positioned in the opening. The through hole has a diameter generally corresponding to the internal diameter of the end portion of one of the conduits. The sealing portion generally corresponds in shape to the shape of the opening.

Another aspect of the present invention includes a coupling for connecting two adjacent conduits in a fluid communication, which comprises a generally cylindrical body defining a recess therethrough and including first and second end portions for cooperating with the respective end portions of two adjacent conduits. The body includes an opening between the first and second portions which is in communication with the recess. The body includes a trough which is disposed generally opposite to the opening. A sealing door including a through hole and a sealing portion is provided to be positioned in the opening.

Another aspect of the present invention includes a coupling to be positioned adjacent an end of a conduit, which comprises a generally cylindrical body defining a recess therethrough and including an end portion for cooperating with an end portion of a conduit. The body includes an opening about the circumference thereof which is in communication with the recess. A sealing door including a through hole having a diameter generally corresponding to the internal diameter of the end portion of the conduit is provided to be positioned in the opening.

Another aspect of the present invention includes a coupling to be positioned adjacent an end of a conduit, which comprises a generally cylindrical body defining a recess therethrough and including an end portion for cooperating with an end portion of a conduit. The body includes an opening about the circumference thereof which is in communication with the recess. The body includes a trough which is disposed generally opposite to the opening. A sealing door including a through hole and a sealing portion is provided to be positioned in the opening.

Another aspect of the present invention includes a leak testing device to be positioned between two adjacent conduits, which comprises a generally cylindrical body defining a recess therethrough and including first and second end portions for cooperating with the respective end portions of two adjacent conduits. The body includes an opening between the first and second end portions. A sealing door is provided to be positioned in the opening. A diaphragm member including a through hole is provided to be positioned within the body. A valve is operably connected to the diaphragm member for selectively opening or closing the through hole to thereby permit or restrict the flow of a fluid between the two conduits. The opening in the body receives the diaphragm member when leak-testing a conduit, or the sealing door when connecting the two conduits in a fluid communication.

Another aspect of the present invention includes a leak testing device to be positioned between two adjacent conduits, which comprises a generally cylindrical body defining a recess therethrough and including first and end portions for cooperating with the respective end portions of two adjacent conduits. The body includes an opening between the first and second end portions and a trough which is disposed generally opposite to the opening. A sealing door is provided to be positioned in the opening. A diaphragm member including a through hole is provided to be positioned within the body. A valve is operably connected to the diaphragm member for selectively opening or closing the through hole to thereby permit or restrict the flow of a fluid between the conduits. The opening in the body receives the diaphragm member when leak-testing a conduit, or the sealing door when connecting two conduits in a fluid communication.

Another aspect of the present invention includes a leak testing device to be positioned adjacent an end of a conduit, which comprises a generally cylindrical body defining a recess therethrough and including an end portion for cooperating with an end portion of a conduit. The body includes an opening about the circumference thereof which is in communication with the recess. A sealing door is provided to be positioned in the opening. A diaphragm member including a through hole is provided to be positioned within the body. A valve is operably connected to the diaphragm member for selectively opening or closing the through hole to thereby permit or restrict the flow of a fluid therethrough. The opening in the body receives the diaphragm member when leak-testing a conduit, or the sealing door when connecting the conduit with another conduit in a fluid communication.

Another aspect of the present invention includes a leak testing device to be positioned adjacent an end of a conduit, which comprises a generally cylindrical body defining a recess therethrough and including an end portion for cooperating with an end portion of a conduit. The body includes an opening about the circumference thereof which is in communication with the recess. The body includes a trough which is disposed generally opposite to the opening. A sealing door is provided to be positioned in the opening. A diaphragm member including a through hole is provided to be positioned within the body. A valve is operably connected to the diaphragm member for selectively opening or closing the through hole to thereby permit or restrict the flow of a fluid therethrough. The opening in the body receives the diaphragm member when leak-testing a conduit, or the sealing door when connecting the conduit with another conduit in a fluid communication.

Another aspect of the present invention includes a coupling for connecting one or more conduits in a fluid communication, which comprises a generally cylindrical body defining a recess therein and including first and second end portions. One of the first and second end portions for cooperating with an end portion of a conduit. The body includes a first opening between the first and second end portions for receiving a sealing door. The sealing door includes a through hole having a diameter generally corresponding to the internal diameter of the end portion of the conduit. A window is provided for viewing the interior of the body.

Another aspect of the present invention includes a leak testing device to be positioned adjacent one or more conduits, which comprises a generally cylindrical body defining a recess therein and including first and second end portions. One of the first and second end portions for cooperating with an end portion of a conduit. The body includes a first opening between the first and second end portions. A sealing door or a test door is selectively positioned in the first opening. A diaphragm member including a through hole is provided to be positioned within the body. A valve is operably connected to the diaphragm member for selectively opening or closing the through hole to thereby permit or restrict the flow of a fluid therethrough. A window is provided for viewing the interior of the body. The first opening in the body receives the diaphragm member and the test door when leak-testing a conduit, or the sealing door when connecting one or more conduits in a fluid communication.

Another aspect of the present invention includes a coupling for connecting one or more conduits in a fluid communication, which comprises a generally cylindrical body defining a recess therein and including first and second end portions. One of the first and second end portions for cooperating with an end portion of a conduit. The body includes an opening between the first and second end portions. A side extension defines a passageway therethrough in communication with the opening and includes a port opening to the exterior. The body includes a trough on the internal periphery thereof and extends on the internal periphery of the side extension. A sealing door is provided for closing the port.

Another aspect of the present invention includes a leak testing device to be positioned adjacent one or more conduits, which comprises a generally cylindrical body defining a recess therein and including first and second end portions. One of the first and second end portions for cooperating with an end portion of a conduit. The body includes an opening between the first and second end portions. A side extension defines a passageway therethrough in communication with the opening and includes a port opening to the exterior. The body includes a trough on the internal periphery thereof and extends on the internal periphery of the side extension. A sealing door is provided for closing the port. A diaphragm member including a through hole is provided to be positioned within the body through the port. A valve is operably connected to the diaphragm member for selectively opening or closing the through hole to thereby permit or restrict the flow of a fluid therethrough. The port receives the diaphragm member when leak-testing a conduit, or the sealing door when connecting one or more conduits in a fluid communication.

Another aspect of the present invention includes a method of testing for a leak in a conduit, which comprises providing a first conduit to be leak-tested; providing a second conduit; and providing a leak testing device between the end portions of the first and second conduits, wherein the leak testing device comprises a generally cylindrical body defining a recess therethrough and including first and second end portions for cooperating with the respective end portion of two adjacent conduits. The body includes an opening between the first and second end portions. A sealing door is provided to be positioned in the opening. A diaphragm member including a through hole is provided to be positioned within the body. A valve is operably connected to the diaphragm member for selectively opening or closing the through hole to thereby permit or restrict the flow of a fluid between the two conduits. The opening in the body receives the diaphragm member when leak-testing a conduit, or the sealing door when connecting the two conduits in a fluid communication. The diaphragm is then positioned in the recess through the opening and the valve is actuated to restrict the flow of fluid between the first and second conduits. The first conduit is filled with a fluid and inspected for any leaks. The valve is then actuated to permit the flow of fluid from the first conduit to the second conduit.

Another aspect of the present invention includes a method of testing for a leak in a conduit, which comprises providing a first conduit to be leak-tested; providing a second conduit; and providing a leak testing device between the end portions of the first and second conduits, wherein the leak testing device comprises a generally cylindrical body defining a recess therethrough and including first and end portions for cooperating with the respective end portions of two adjacent conduits. The body includes an opening between the first and second end portions and a trough which is disposed generally opposite to the opening. A sealing door is provided to be positioned in the opening. A diaphragm member including a through hole is provided to be positioned within the body. A valve is operably connected to the diaphragm member for selectively opening or closing the through hole to thereby permit or restrict the flow of a fluid between the conduits. The opening in the body receives the diaphragm member when leak-testing a conduit, or the sealing door when connecting two conduits in a fluid communication. The diaphragm is then positioned in the recess through the opening and the valve is actuated to restrict the flow of fluid between the first and second conduits. The first conduit is filled with a fluid and inspected for any leaks. The valve is then actuated to permit the flow of fluid from the first conduit to the second conduit.

Another aspect of the present invention includes a method of testing for a leak in a conduit, which comprises providing a conduit to be leak-tested and providing a leak testing device adjacent an end of the conduit, wherein the leak testing device comprises a generally cylindrical body defining a recess therethrough and including an end portion for cooperating with an end portion of a conduit. The body includes an opening about the circumference thereof which is in communication with the recess. A sealing door is provided to be positioned in the opening. A diaphragm member including a through hole is provided to be positioned within the body. A valve is operably connected to the diaphragm member for selectively opening or closing the through hole to thereby permit or restrict the flow of a fluid therethrough. The opening in the body receives the diaphragm member when leak-testing a conduit, or the sealing door when connecting the conduit with another conduit in a fluid communication. The diaphragm is then positioned in the recess through the opening and the valve is actuated to restrict the flow of fluid through the hole. The conduit is filled with a fluid and inspected for any leaks. The valve is then actuated to permit the flow of fluid through the hole.

Another aspect of the present invention includes a method of testing for a leak in a conduit, which comprises providing a conduit to be leak-tested and providing a leak testing device adjacent an end of the conduit, wherein the leak testing device comprises a generally cylindrical body defining a recess therethrough and including an end portion for cooperating with an end portion of a conduit. The body includes an opening about the circumference thereof which is in communication with the recess. The body includes a trough which is disposed generally opposite to the opening. A sealing door is provided to be positioned in the opening. A diaphragm member including a through hole is provided to be positioned within the body. A valve is operably connected to the diaphragm member for selectively opening or closing the through hole to thereby permit or restrict the flow of a fluid therethrough. The opening in the body receives the diaphragm member when leak-testing a conduit, or the sealing door when connecting the conduit with another conduit in a fluid communication. The diaphragm is then positioned in the recess through the opening and the valve is actuated to restrict the flow of fluid through the hole. The conduit is filled with a fluid and inspected for any leaks. The valve is then actuated to permit the flow of fluid through the hole.

Another aspect of the present invention includes a method of testing for a leak in a conduit, which comprises providing a conduit to be leak-tested; providing a leak testing device adjacent an end portion of the conduit, wherein the leak testing device comprises a generally cylindrical body defining a recess therein and including first and second end portions. One of the first and second end portions for cooperating with the end portion of the conduit. The body includes an opening between the first and second end portions. A sealing door is provided to be positioned in the opening. A diaphragm member including a through hole is provided to be positioned within the body. A valve is operably connected to the diaphragm member for selectively opening or closing the through hole to thereby permit or restrict the flow of a fluid therethrough. A window is provided for viewing the interior of the body. The opening in the body receives the diaphragm member when leak-testing a conduit, or the sealing door when connecting one or more conduits in a fluid communication. The diaphragm is then positioned in the recess through the opening and the valve is actuated to restrict the flow of fluid through the hole. The conduit is filled with a fluid and inspected for any leaks. The valve is then actuated to permit the flow of fluid through the hole.

Another aspect of the present invention includes a method of testing for a leak in a conduit, which comprises providing a conduit to be leak-tested; providing a leak testing device adjacent an end portion of the conduit, wherein the leak testing device comprises a generally cylindrical body defining a recess therein and including first and second end portions. One of the first and second end portions for cooperating with the end portion of the conduit. The body includes an opening between the first and second end portions. A side extension defines a passageway therethrough in communication with the opening and includes a port opening to the exterior. The body includes a trough on the internal periphery thereof and extends on the internal periphery of the side extension. A sealing door is provided for closing the port. A diaphragm member including a through hole is provided to be positioned within the body through the port. A valve is operably connected to the diaphragm member for selectively opening or closing the through hole to thereby permit or restrict the flow of a fluid therethrough. The port receives the diaphragm member when leak-testing a conduit, or the sealing door when connecting one or more conduits in a fluid communication. The diaphragm is then positioned in the recess through the port and the valve is actuated to restrict the flow of fluid through the hole. The conduit is filled with a fluid and inspected for any leaks. The valve is then actuated to permit the flow of fluid through the hole.

BRIEF DESCRIPTION OF THE DRAWINGS

One of the above objects, advantages and novel features of the present invention will become apparent from the following detailed description of the preferred embodiment(s) of the invention, illustrated in the accompanying drawings, wherein:

FIG. 1 is a partial elevational view of a plumbing system showing a T-fitting installed between two conduits;

FIG. 2 is a perspective view showing the leak testing device of the invention installed in cooperation with two adjacent conduits;

FIG. 3 is a side elevational view of the leak testing device shown in FIG. 2;

FIG. 4 is a cross-sectional view taking along line 4-4 of FIG. 3;

FIG. 6 is a cross-sectional view taken along line 6-6 of FIG. 4;

FIG. 8 is top perspective view of a diaphragm member with an associated gasket for the leak testing device of the present invention;

FIG. 9 is a bottom perspective view of the diaphragm member shown in FIG. 8;

FIG. 10 is a perspective view of a sealing clip for the leak testing device of the invention;

FIG. 11 is a cross-sectional view taken along line 11-11 of FIG. 5;

FIG. 12 is a partial exploded view showing the permanent coupling of the present invention in cooperation with two adjacent conduits;

FIG. 13 is a perspective view of the permanent coupling shown in FIG. 12 connecting two adjacent conduits in a fluid communication;

FIG. 14 is a cross-sectional view taken along line 14-14 of FIG. 13;

FIG. 15 is a view similar to FIG. 2, showing a first alternative embodiment of the leak testing device;

FIG. 16 is a cross-sectional view taken along line 16-16 of FIG. 15;

FIG. 17 is a cross-sectional view taken along line 17-17 of FIG. 16;

FIG. 18 is an exploded view of the leak testing device shown in FIG. 15;

FIG. 19 is a cross-sectional view taken along line 19-19 of FIG. 18;

FIG. 20 is a partial exploded view showing a first alternative embodiment of the permanent coupling of the present invention in cooperation with two adjacent conduits;

FIG. 21 is a perspective view of the permanent coupling shown in FIG. 20 connecting two adjacent conduits in a fluid communication;

FIG. 22 is a cross-sectional view taken along line 22-22 of FIG. 21;

FIG. 23 is a view similar to FIG. 2, showing a second alternative embodiment of the leak testing device;

FIG. 24 is a cross-sectional view taken along line 24-24 of FIG. 23;

FIG. 25 is a cross-sectional view taken along line 25-25 of FIG. 24;

FIG. 31 is a view similar to FIG. 2, showing a third alternative embodiment of the leak testing device;

FIG. 32 is a cross-sectional view taken along line 32-32 of FIG. 31;

FIG. 33 is a cross-sectional view taken along line 33-33 of FIG. 32;

FIG. 34 is an exploded view of the leak testing device shown in FIG. 31;

FIG. 35 is a cross-sectional view taken along line 35-35 of FIG. 34;

FIG. 37 is an exploded view showing a third alternative embodiment of the permanent coupling of the present invention in cooperation with two adjacent conduits; and FIG. 38 is a cross-sectional view taken along line 38-38 of FIG. 36.

DETAILED DESCRIPTION OF THE PREFERRED EMBODIMENT(S)

As illustrated in FIG. 1, the leak testing device LD of the present invention is used in connection with an existing pipe or conduit 10 extending from a floor F or the like, and a new pipe 12. Conventionally, a T-fitting 4 is provided between the existing and new pipes 10 and 12, respectively, prior to testing the new pipe 12 for any leaks. The leak testing device LD of the present invention is preferably used without a T-fitting, as shown in FIG. 2.

Figure 5:
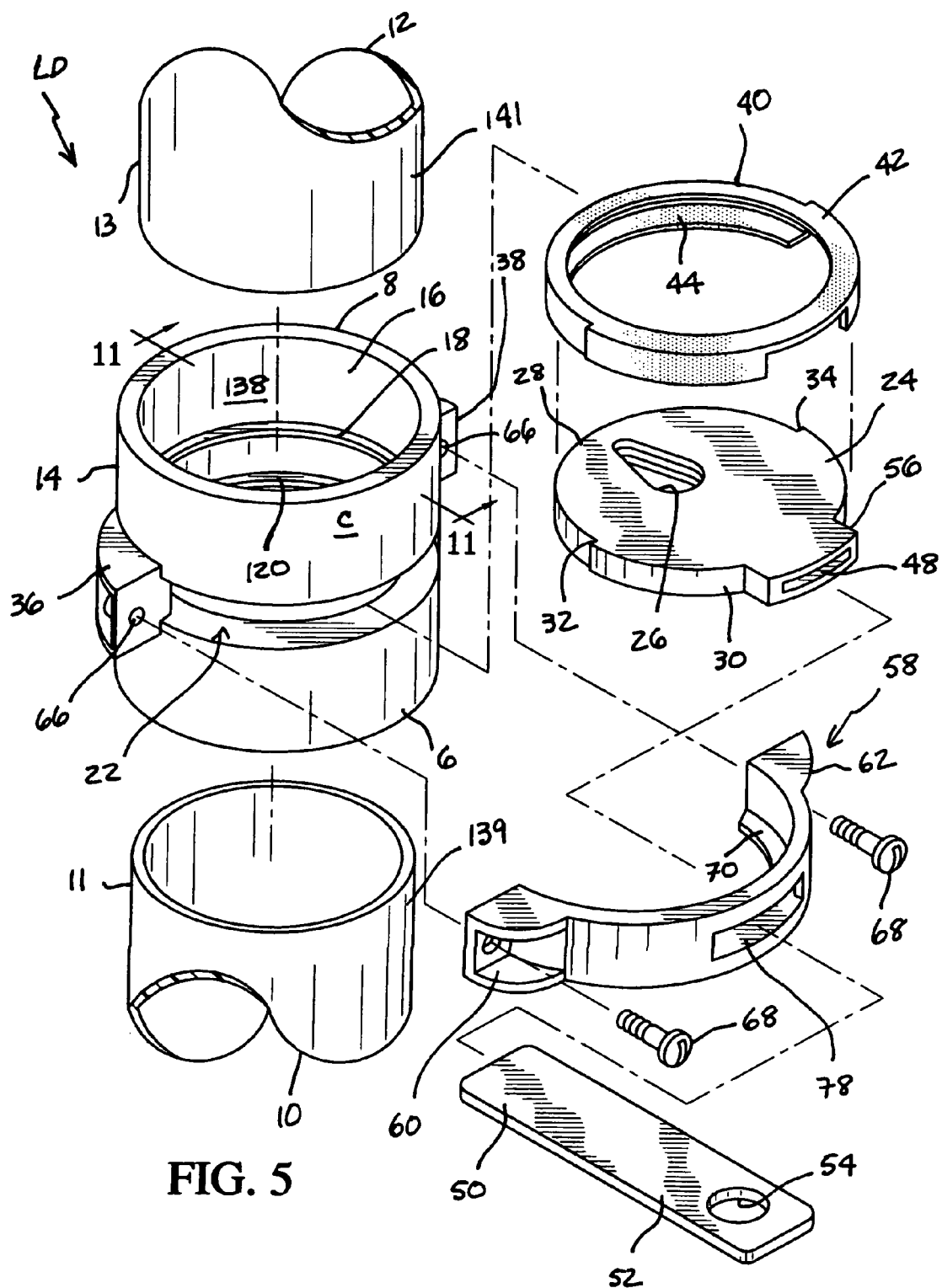
FIG. 5 is an exploded view of the leak testing device shown in FIG. 2.

As best shown in FIGS. 4-5 and 11, the leak testing device LD includes a coupling C in the form of a generally cylindrical body 14 which defines therein a recess 16 between open end portions 6 and 8 thereof. As best illustrated in FIGS. 5 and 11, upper and lower shoulder or lip portions 18 and 20 extend radially into the recess 16, and preferably extend throughout the internal perimeter of the body portion 14. In other words, upper and lower shoulder portions 18 and 20 are preferably in the form of axially-spaced internal rings that extend radially into the recess 16. (It is noted herewith that the shoulder portions 18 and 20 may alternatively be in the form of one or more circumferentially spaced tabs that extend into the recess 16 from the internal perimeter of the body 14). The body 14 includes a generally crescent-shaped side opening 22 that is in communication with the recess 16. Preferably, the side opening 22 extends about half-way around the circumference of the body 14 (FIG. 5).

As best shown in FIGS. 5 and 8-9, a generally circular diaphragm member 24, with a through hole 26 is provided to be received between the upper and lower shoulder portions 18 and 20 through the side opening 22. As shown in FIG. 5, the diaphragm member 24 includes a rounded front end portion 28 of a diameter somewhat less than the diameter of a rounded rear end portion 30. The front and rear end portions 28 and 30 define left and right steps 32 and 34 that abut corresponding left and right locking tabs 36 and 38 on the body 14. In this manner, the steps 32 and 34 function as stops for the diaphragm member 24 when inserting through the side opening 22. In order to provide a fluid-tight engagement between the diaphragm member 24 and the upper and lower shoulder portions 18 and 20, a generally ring-shaped gasket 40, preferably made of a resilient or compressible material, is snap-fitted on the diaphragm member 24. As best shown in FIGS. 8 and 9, the overall configuration of the gasket 40 generally corresponds to the overall configuration of the diaphragm member 24. The gasket 40 includes upper and lower lips 42 and 44 for securing the gasket 40 on the diaphragm member 24. In this regard, it is noted that the overall thickness $T_1$ of the diaphragm member 24 with the associated gasket 40, is preferably slightly more than the distance $D_1$ between the upper and lower shoulder portions 18 and 20 to ensure a tight frictional engagement therebetween (FIGS. 8 and 11).

As best shown in FIGS. 4-6 and 8, a valve assembly 46 includes a radially extending recess 48 in the diaphragm member 24 for receiving a valve member 50 therein. The valve member 50 is preferably integral with a valve handle 52 positioned externally of the body 14. The recess 48 is in fluid communication with the diaphragm hole 26. A hole 54 is provided in the valve handle 52 for the ease of holding and actuation thereof.

The diaphragm member 24 includes a somewhat square-shaped extension 56 that extends from the rear end portion 30 thereof. When the diaphragm member 24 is inserted through the side opening 22 of the body 14, the rear end portion 30 thereof is preferably flush with the external periphery of the body 14, while the extension 56 projects outwardly for the ease of manipulating the valve handle 52.

In order to secure the diaphragm member 24 in the body 14 and to provide a fluid-tight engagement therebetween, a generally semi-circular sealing clip 58 is provided (FIGS. 5 and 10). The clip 58 includes left and right tabs 60 and 62 that come to abut corresponding left and right tabs 36 and 38 of the body 14. Each of the left and right tabs 60 and 62 includes a hole 64 that is in alignment with the corresponding screw-threaded hole 66 in the tabs 36 and 38. Conventional partially screw-threaded fasteners 68 are provided through the holes 64 to be screw-threaded in the corresponding screw-threaded holes 66 for interlocking the clip 58 with the body 14.

As best shown in FIGS. 6 and 10, the sealing clip 58 includes an internal, radially extending lip 70 which functions as a cam to bias the diaphragm member 24 upwardly to compress the upper lip 42 of the gasket 40 against the surface 72 of the upper shoulder portion 18 (FIG. 11). The lower surface 74 of the lip 70 is somewhat tapered to firmly engage the corresponding tapered surface 76 of the lower shoulder portion 20. The sealing clip 58 includes a generally rectangularly-shaped side hole 78 for receiving the correspondingly shaped extension 56 of the diaphragm member 24.

As described below, once the testing of a pipe or conduit is completed for leaks, the diaphragm member 24, along with the valve assembly 46 and the sealing clip 58, is removed from the body 14, but the conduit coupling C is left in position to connect the adjacent conduits 10 and 12 in a fluid communication. In order to prevent fluid leakage through the side opening 22, a sealing door 80 is provided.

As best shown in FIG. 12, the sealing door 80 includes a front rounded or generally ring-shaped fluid-flow portion 82 and a rear sealing portion 84. The fluid-flow portion 82 and the sealing portion 84 define therebetween a through hole 86 that generally corresponds in diameter to the internal diameter of the end portion of one (or both) of the conduits 10 and 12.

As best shown in FIG. 14, the fluid-flow portion 82 has a vertical height $H_1$ that generally corresponds to the distance $D_1$ (FIG. 11) between the upper and lower shoulder portions 18 and 20 for a tight frictional engagement therebetween. Likewise, the vertical height $H_2$ of the sealing portion 84 (being slightly more than $H_1$) generally corresponds to the distance $D_2$ between upper and lower shoulder portions 18 and 20 adjacent the side opening 22. The sealing door 80 includes handles 88 and 90 for the ease of inserting the sealing door 80 through the side opening 22 and removal therefrom. The sealing door 80 also includes tabs 92 and 94, each with a hole 96, that come to abut corresponding tabs 36 and 38 on the body 14.

As best shown in FIGS. 8 and 11, the internal diameter of the body 14 (or the diameter of recess 16) generally corresponds to, or is slightly larger than, the external diameter of the end portions 11 and 13 the conduits 10 and 12, respectively, for a fluid-tight engagement therebetween. However, it is noted that the internal diameter $ID_1$ of the recess 16, as defined by the upper and lower shoulder portions 18 and 20, generally corresponds to the internal diameter of the end portions 11 and 13 of the conduits 10 and 12. Likewise, the internal diameter $ID_2$ of the hole 86 in the sealing door 80 generally corresponds to the internal diameter of the end portions 11 and 13 of the conduits 10 and 12 (FIG. 14). In this manner, when the sealing door 80 is installed, a generally continuous, uninterrupted fluid flow surface 98 is provided from one conduit to the other.

FIGS. 15-22 illustrate an alternative embodiment of the leak testing device LD of the invention, which is similar to the embodiment illustrated in FIGS. 2-14, with the exception that the coupling C is provided with a trough in place of the upper and lower shoulder portions 18 and 20, and the sealing door construction is slightly different. In addition, the end portions 6 and 8 of the coupling C generally correspond in diameter to the end portions 11 and 13 of the conduits 10 and 12. (It is noted herewith that in the alternative embodiment, like parts are designated with the same reference numerals as in the embodiment shown in FIGS. 2-14).

As best shown in FIGS. 18-19, the coupling C is in the form of a cylindrical body 100 including a trough 102 that extends outwardly from the recess 104. The trough 102 preferably extends about half-way around the circumference of the body 100 and is disposed generally opposite a generally crescent-shaped side opening 106. The side opening 106 also preferably extends about half-way around the circumference of the body 100 and is in fluid communication with the recess 104. The shape and configuration of the trough 102 corresponds to the front end portion 28 of the diaphragm member 24 for providing a secure and fluid-tight engagement therebetween.

With respect to the sealing door 108, it has the same overall configuration as the sealing door 80, with the exception that the front fluid-flow portion 110 is thicker to be accommodated in the trough 102, and the rear sealing portion 112 is of the same general thickness as the body 100 (FIGS. 20 and 22). The sealing door 108 also includes handles 114 and 116. The through hole 120 in the sealing door 108, defined by the front and rear portions 110 and 112, has a diameter generally corresponding to the diameter of the recess 104.

It is noted that the diameter of the recess 104 in the coupling C generally corresponds to the internal diameter of the end portion of one (or both) the conduits 10 and 12. Accordingly, as in the embodiment illustrated in FIGS. 2-14, a generally continuous, uninterrupted fluid flow surface 122 is also provided from one conduit to the other, when the sealing door 108 is positioned in the side opening 106.

In order to secure the conduits 10 and 12 to the coupling C, conventional split-clamp assemblies 124 and 126 are provided (FIGS. 20-22).

Figure 7:
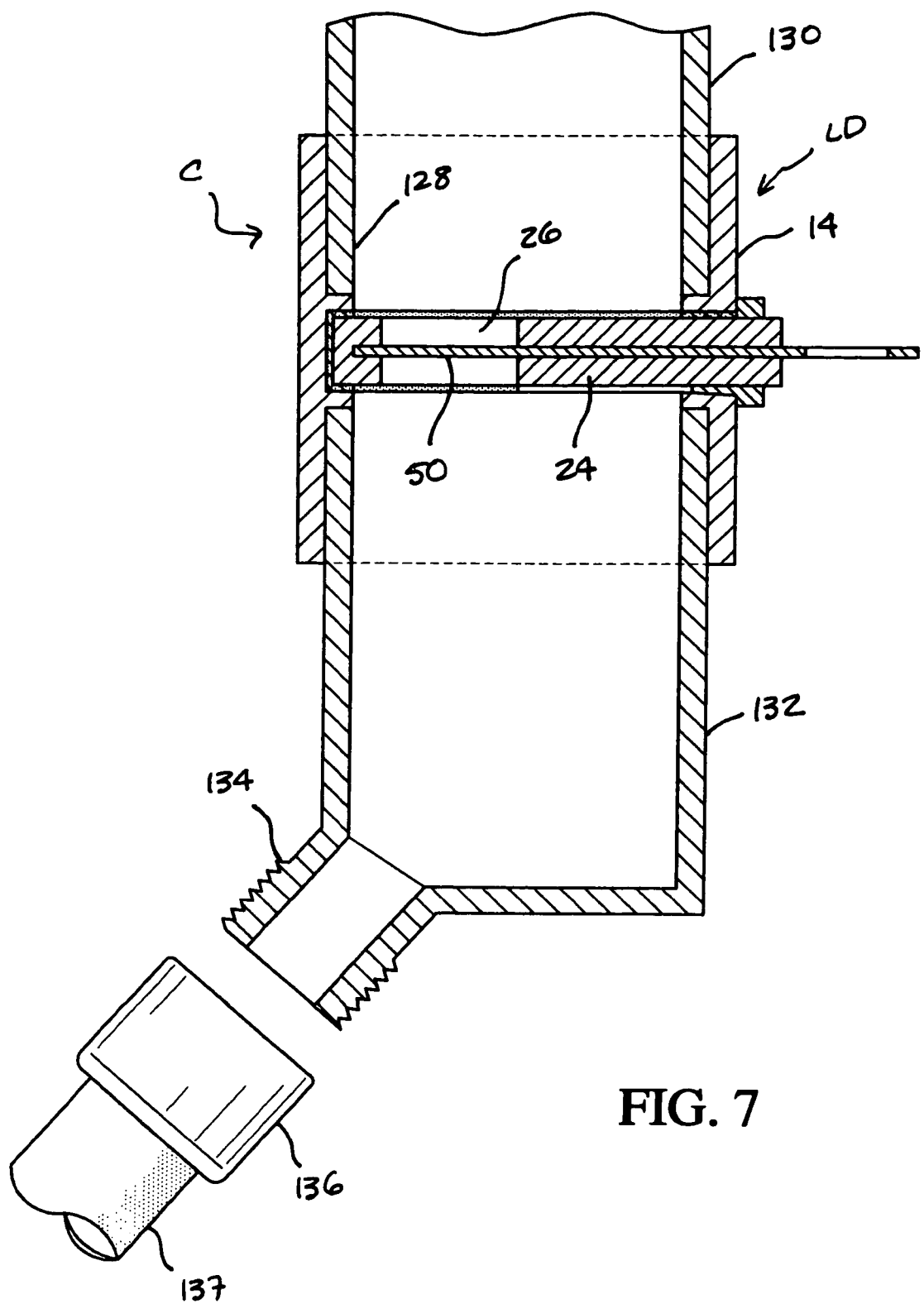
FIG. 7 is a view similar to FIG. 6, showing the leak testing device installed in cooperation with one conduit and a fluid discharge device.

FIG. 7 illustrates the leak testing device LD, shown in FIGS. 2-6 and 8-14, installed adjacent an end 128 of a single conduit 130. This type of arrangement is generally useful for leak testing a conduit by installing one leak testing device LD of the invention at each end thereof, or where, for example, the conduit extends down through a ceiling.

As shown, the leak testing device LD is positioned adjacent the single conduit 128 and a fluid discharge conduit 132. The fluid discharge conduit 132 includes a screw-threaded nipple 134 for cooperating with the coupling 136 of, for example, a garden hose 137. It is noted herewith that the leak testing device LD, shown in FIGS. 15-22, may also be used with a single conduit, in the same manner.

Figure 27:
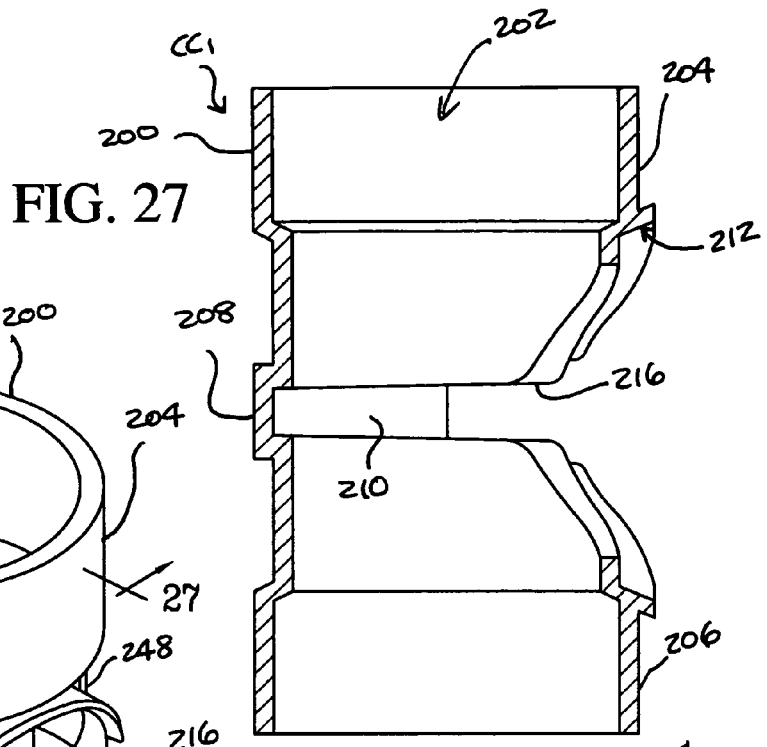
FIG. 27 is a cross-sectional view taken along line 27-27 of FIG. 26.

FIGS. 23-30 illustrate a second alternative embodiment of the leak testing device LD of the invention, which includes a coupling $CC_1$ in the form of a generally cylindrical body 200 defining therein a recess 202 between open end portions 204 and 206. As best shown in FIG. 27, the coupling $CC_1$ includes in the middle portion 208 thereof, an inwardly tapered trough 210 that extends radially outwardly from the recess 202. The trough 210 preferably extends about half-way around the internal circumference of the body 200 and is disposed generally opposite an oval side opening 212. The side opening 212 spans axially between the end portions 204 and 206, extends radially inwardly towards the center of the body 200 and is outwardly flared to provide a better seal and to prevent debris build up (FIGS. 24 and 27). Two generally opposite circumferential openings 214 and 216 communicate with the side opening 212. The side opening 212 and the circumferential openings 214 and 216, are all in fluid communication with the recess 202.

Figure 26:
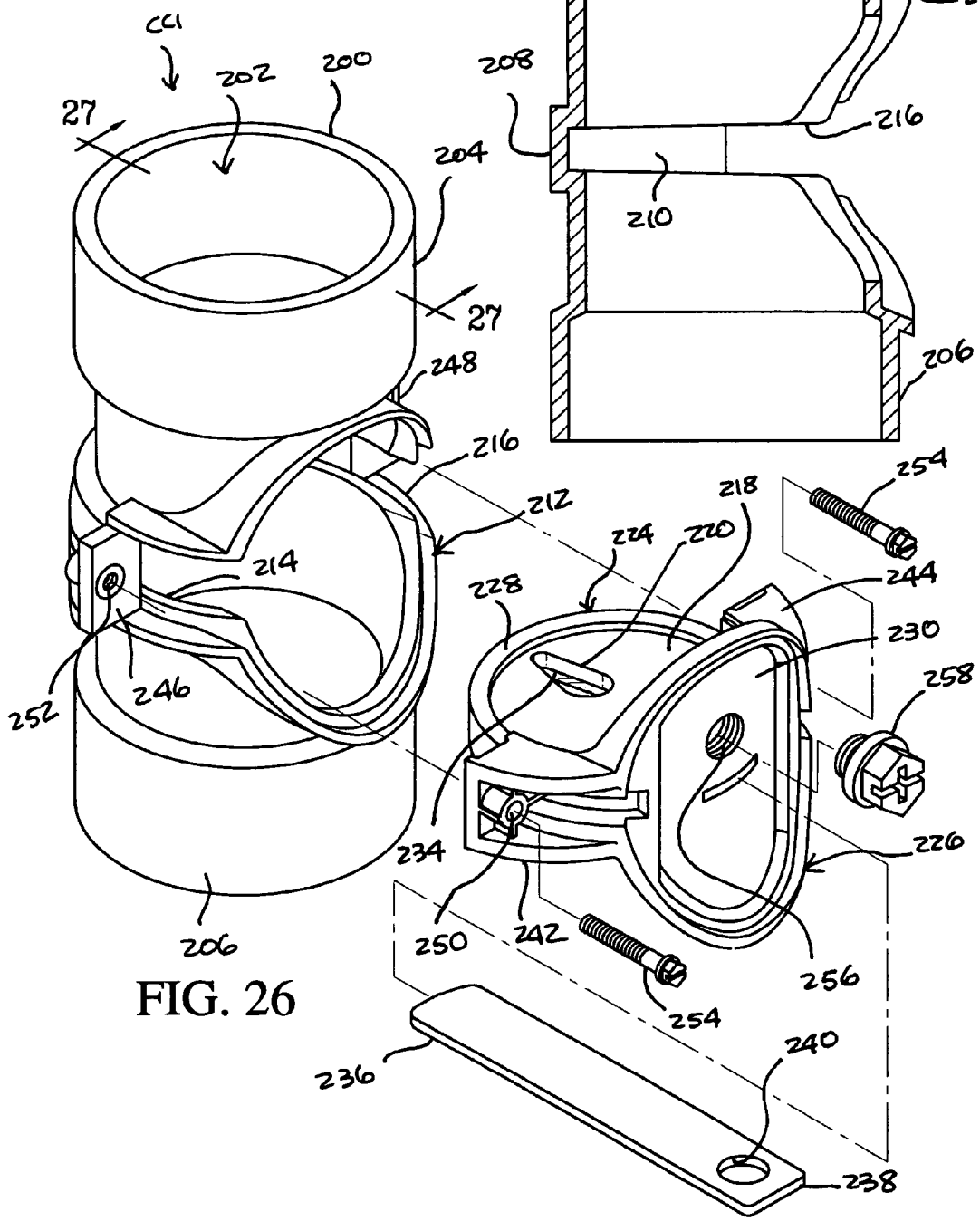
FIG. 26 is an exploded view of the leak testing device shown in FIG. 23.

As best shown in FIGS. 24-26, a generally circular, tapered diaphragm member 218, with preferably two through holes 220 and 222, is provided to be received into the recess 202, through the side opening 212 and the circumferential openings 214 and 216. As best shown in FIG. 26, the diaphragm member 218 includes a rounded front end portion 224 to be received in the trough 210. A test door 226, generally corresponding in shape to the side opening 212, is preferably integral with the diaphragm 218. A gasket member 228, preferably made of a resilient or compressible material is provided on the diaphragm member 218 and extends upwardly on the inside surface of the upper section 230 of the test door 226 (FIG. 24). The gasket 228 ensures a fluid-tight engagement of the diaphragm member 218 in the trough 210, and of the upper section 230 of the test door 226 and the side opening 212 and the circumferential openings 214 and 216.

As best shown in FIGS. 24-26, a valve assembly 232 includes a radially extending recess 234 in the diaphragm member 218 for receiving a valve member 236 therein. The valve member 236 is preferably integral with the valve handle 238 positioned externally of the body 200. The recess 202 is in fluid communication with the diaphragm holes 220 and 222. A hole 240 is provided in the valve handle 238 for ease of holding and actuation thereof.

In order to secure the diaphragm member 218 in the body 200 and to provide a fluid-tight engagement therebetween, left and right tabs 242 and 244 extend out from the test door 226 and come to abut corresponding left and right tabs 246 and 248 of the body 200. Each of the left and right tabs 242 and 244 includes a hole 250 that is in alignment with the corresponding screw-threaded hole 252 in the tabs 246 and 248. Conventional partially screw-threaded fasteners 254 are provided through the holes 250 to be screw-threaded in the corresponding screw-threaded holes 252 for interlocking the test door 226 with the body 200 and seal the side opening 212 and circumferential openings 214 and 216 (FIGS. 25-26).

Although not necessary, the test door 226 may optionally include a screw-threaded hole 256, which is normally kept sealed by a conventional screw fastener 258. In the instances, where it is desired to determine the pressure inside the body 200, fastener 258 may be removed to mount an appropriate gauge or sensor in or through the hole 256 to monitor or determine the internal pressure during testing or otherwise.

As described below, once the testing of a pipe or conduit is completed for leaks, the diaphragm member 218, along with the valve assembly 232 and the test door 226, is removed from the body 200, but the conduit coupling $CC_1$ is left in position to connect one or more of the adjacent conduits 10 and 12 in a fluid communication. In order to prevent leakage through the side openings 212, 214 and/or 216, a permanent sealing door 260 is provided.

Figure 29:
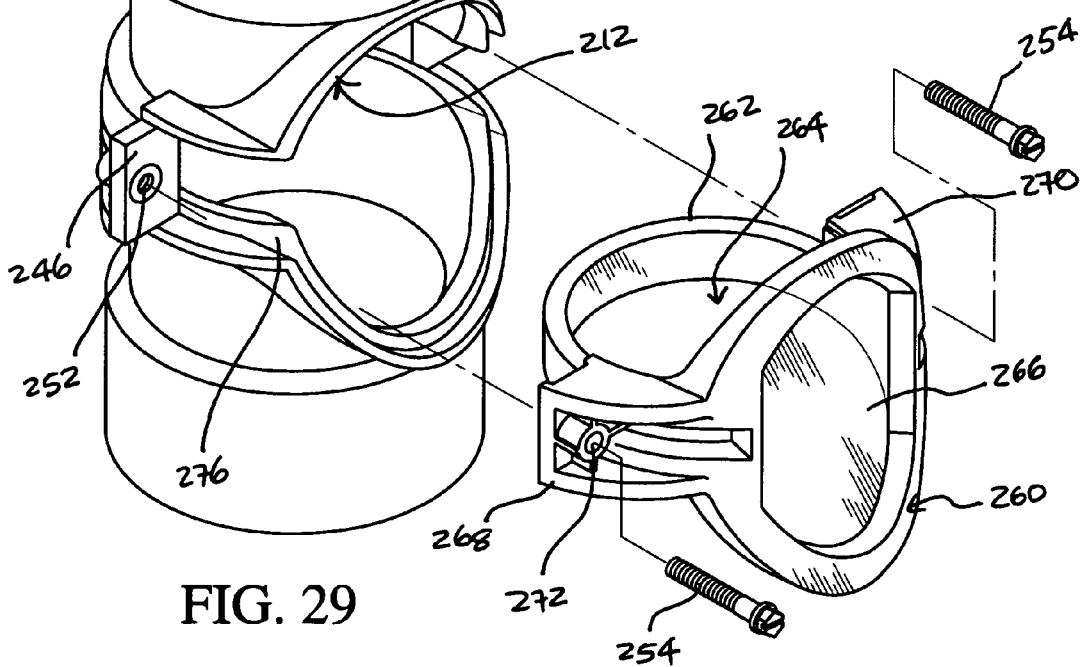
FIG. 29 is an exploded view showing a second alternative embodiment of the permanent coupling of the present invention in cooperation with two adjacent conduits.
Figure 36:
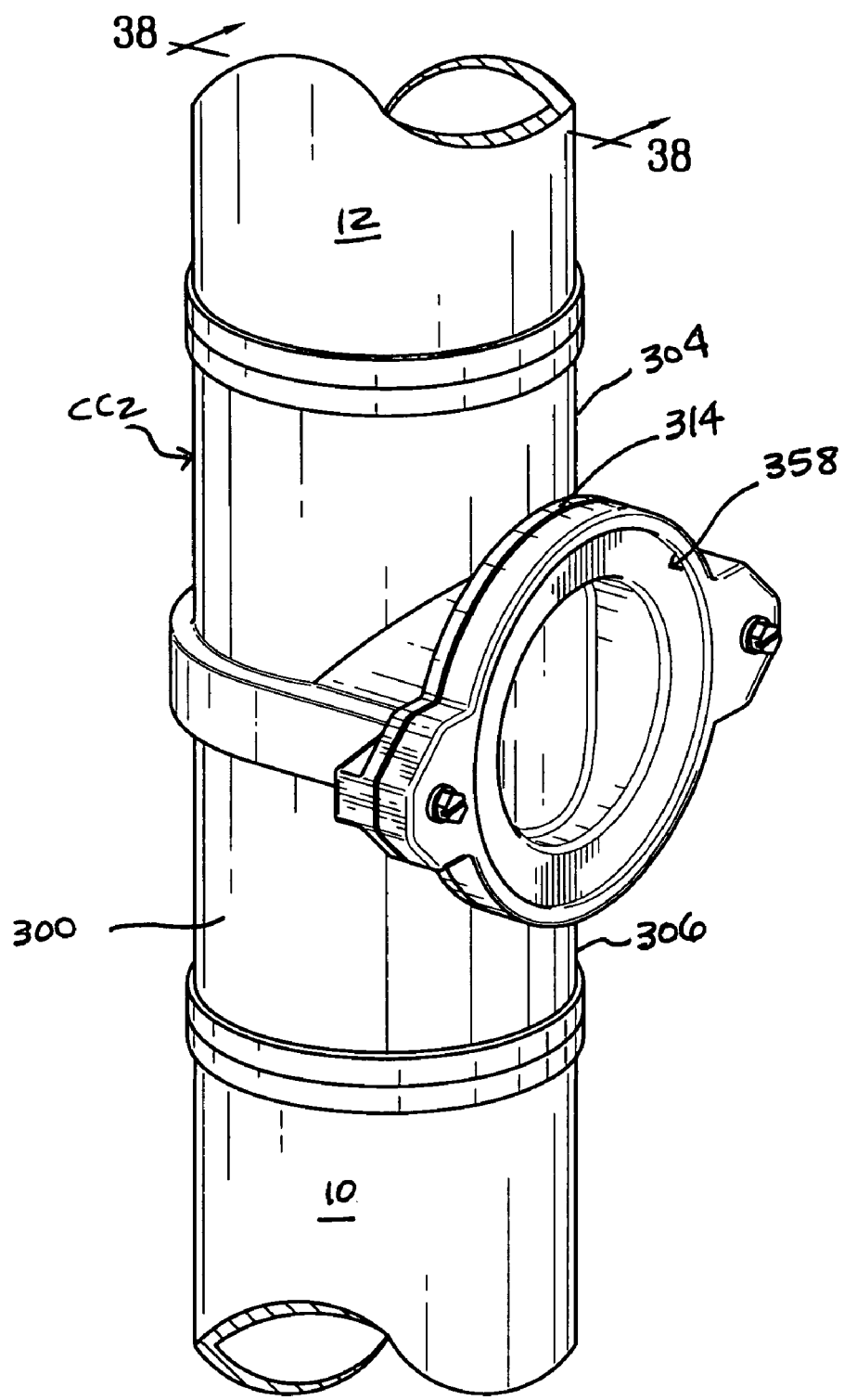
FIG. 36 is a perspective view of the permanent coupling shown in FIG. 37 connecting two adjacent conduits in a fluid communication.

As best shown in FIG. 29, the sealing door 260 generally corresponds in shape and configuration to the test door 226, and includes, preferably integral, front rounded or generally ring-shaped tapered fluid-flow portion 262. The sealing door 260 and the fluid-flow portion 262 define therebetween a through hole 264 that generally corresponds in diameter to the internal diameter of the end portion of one (or both) of the conduits 10 and 12.

Figure 28:
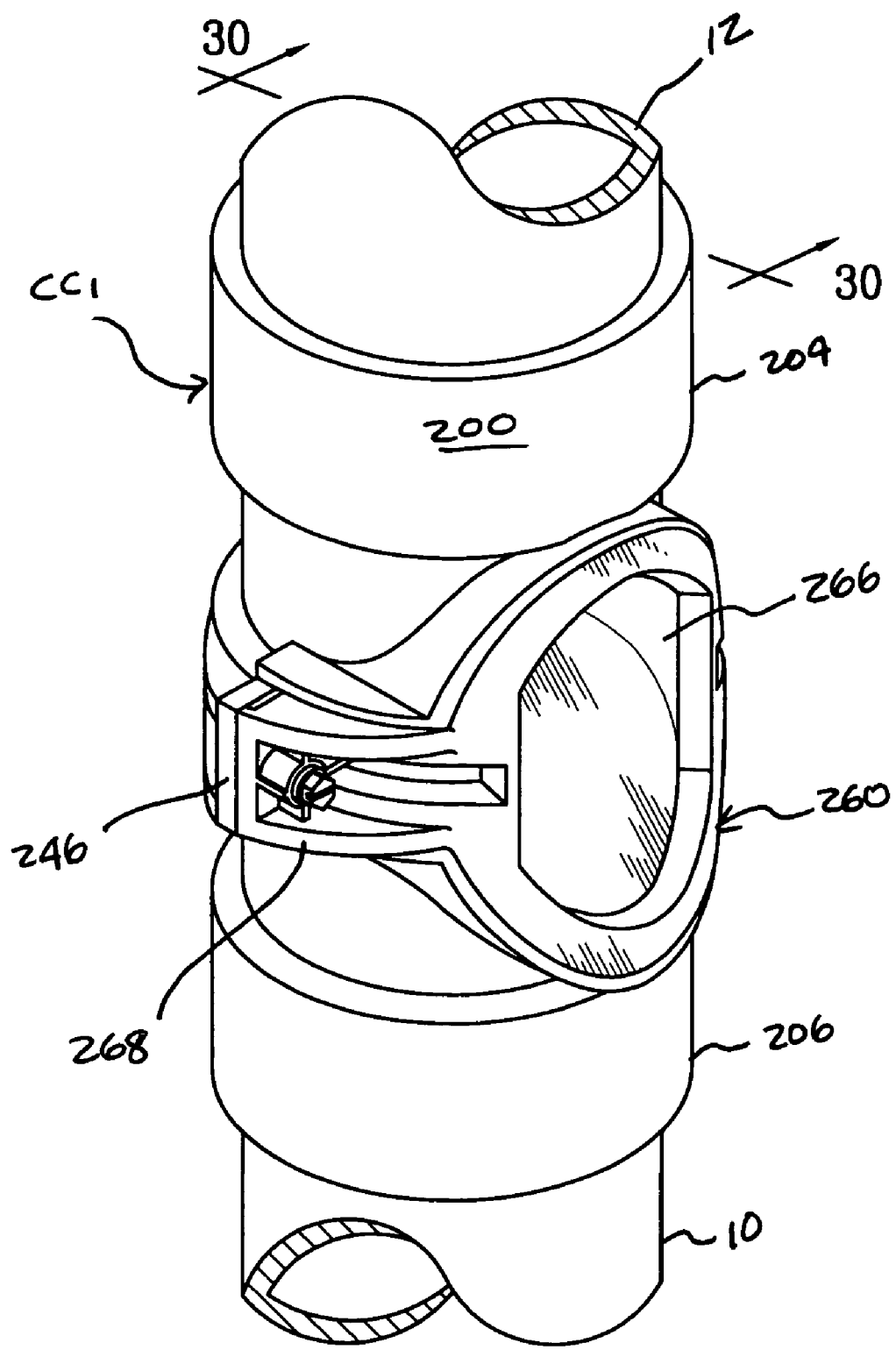
FIG. 28 is a perspective view of the permanent coupling shown in FIG. 29 connecting two adjacent conduits in a fluid communication.

As best shown in FIGS. 28-29, the sealing door 260 includes an optional window 266 made of a generally clear or transparent material to view the inside of the body 200 for troubleshooting, diagnosis, or other purposes. It is noted herewith that the location, configuration, and/or nature of the window, may be varied. For instance, the window may alternatively be provided on the body 200. Further, although not shown, the test door 226 may also include a similar window, if desired.

The sealing door 260 also includes tabs 268 and 270, each with a hole 272, which come to abut corresponding tabs 246 and 248 on the body 200, to be connected together by conventional screw fasteners 254.

Figure 30:
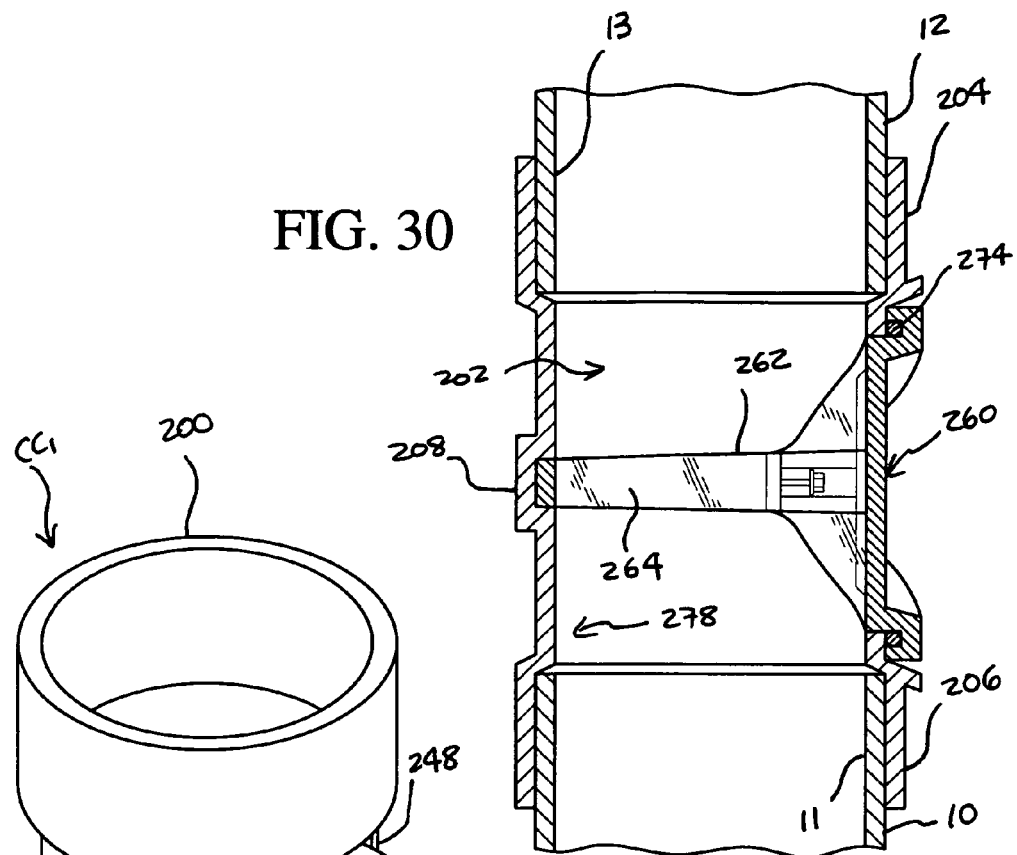
FIG. 30 is a cross-sectional view taken along line 30-30 of FIG. 28.

As best shown in FIG. 30, a ring 274 made of a resilient or compressible material, is provided between the sealing door 260 and the external lip portion 276 of the body 200, traversing the side opening 212 and the circumferential openings 214 and 216, to provide a fluid-tight engagement therebetween.

As best shown in FIGS. 24 and 30, the internal diameter of the end portions 204 and 206, generally correspond to, or are slightly larger than the external diameter of the end portions 13 and 11 of the conduits 12 and 10, respectively, for a fluid-tight engagement therebetween. However, it is noted that the internal diameter of the recess 202, in the middle portion 208 of the body 200, generally corresponds to the internal diameter of the end portions 11 and 13 of the conduits 10 and 12. Likewise, the internal diameter of the through hole 264 in the sealing door 260 generally corresponds to the internal diameter of the end portions 11 and 13 of the conduits 10 and 12 (FIG. 30). In this manner, when the sealing door 260 is installed, a generally continuous, uninterrupted fluid flow surface 278 is provided from one conduit to the other.

FIGS. 31-37 illustrate a third alternative embodiment of the leak testing device LD of the invention, which includes a coupling $CC_2$ in the form of a generally cylindrical body 300 defining therein a recess 302 between open end portions 304 and 306. As best shown in FIG. 35, the coupling $CC_2$ includes in the middle portion 308 thereof, an inwardly tapered trough 310 that extends radially outwardly from the recess 302. The trough 310 preferably extends around the internal circumference of the body 300 and is disposed generally opposite side opening 312 in the body.

A side extension 314, defining therein a passageway 316 and a port 318, is in fluid communication with the recess 302. As best shown in FIGS. 34-35, the trough 310 continues its traverse on the inside periphery of the side extension 314. The side opening 312 and the port 318 span axially between the end portions 304 and 306.

As best shown in FIGS. 32-34, a tapered diaphragm member 320, with preferably two through holes 322 and 324, is provided to be received into the recess 302, through the side opening 312 and the port 318. As best shown in FIG. 34, the diaphragm member 320 includes a rounded front end portion 326 to be received in the trough 310. A test door 328, generally corresponding in shape to the port 318, is preferably integral with the diaphragm 320. A gasket member 330, preferably made of a resilient or compressible material is provided on the diaphragm member 320 and extends upwardly on the inside surface of the upper section 332 of the test door 328 (FIG. 32). The gasket 330 ensures a fluid-tight engagement of the diaphragm member 320 in the trough 310, and of the upper section 332 of the test door 328 and the port 318.

As best shown in FIGS. 32-34, a valve assembly 334 includes a radially extending recess 336 in the diaphragm member 320 for receiving a valve member 338 therein. The valve member 338 is preferably integral with the valve handle 340 positioned externally of the body 300. The recess 302 is in fluid communication with the diaphragm holes 322 and 324. A hole 342 is provided in the valve handle 340 for ease of holding and actuation thereof.

In order to secure the diaphragm member 320 in the body 300 and to provide a fluid-tight engagement therebetween, left and right tabs 344 and 346 extend out from the test door 328 and come to abut corresponding left and right tabs 348 and 350 of the body 300. Each of the left and right tabs 344 and 346 includes a hole 352 that is in alignment with the corresponding screw-threaded hole 354 in the tabs 348 and 350. Conventional partially screw-threaded fasteners 356 are provided through the holes 352 to be screw-threaded in the corresponding screw-threaded holes 354 for interlocking the test door 328 with the body 300 and seal the port 318 (FIGS. 33-34).

Although not necessary, the test door 328 may optionally include a screw-threaded hole 329, which is normally kept sealed by a conventional screw fastener 331. In the instances, where it is desired to determine the pressure inside the body 300, fastener 331 may be removed to mount an appropriate gauge or sensor in or through the hole 329 to monitor or determine the internal pressure during testing or otherwise.

As described below, once the testing of a pipe or conduit is completed for leaks, the diaphragm member 320, along with the valve assembly 334 and the test door 328, is removed from the body 300, but the conduit coupling $CC_2$ is left in position to connect one or more of the adjacent conduits 10 and 12 in a fluid communication. In order to prevent leakage through the port 318, a permanent sealing door 358 is provided.

As best shown in FIG. 37, the sealing door 358 generally corresponds in shape and configuration to the test door 328, and cooperates with a tapered fluid-flow ring 360 to be disposed in the trough 310. The sealing door 358 and the fluid-flow ring 360 define therebetween a through hole 362 that generally corresponds in diameter to the internal diameter of the end portion of one (or both) of the conduits 10 and 12. It is noted that fluid-flow ring 360 may be attached or detached from the seal door 358, or made integral therewith.

The sealing door 358 also includes tabs 364 and 366, each with a hole 368, which come to abut corresponding tabs 348 and 350 on the body 300, to be connected together by conventional screw fasteners 356.

A ring 370, generally corresponding in shape to the exterior surface 372 of the side extension 314, and made of a resilient or compressible material, is disposed between the sealing door 358 and the surface 372 to provide a fluid-tight seal therebetween.

As best shown in FIGS. 32 and 38, the internal diameter of the end portions 304 and 306, generally correspond to the internal diameter of the end portions 13 and 11 of the conduits 12 and 10. Further, the diameter of the recess 302 generally corresponds to the internal diameter of the end portions 11 and 13 of the conduits 10 and 12. Likewise, the internal diameter of the through hole 362 in the fluid flow ring 360 generally corresponds to the internal diameter of the end portions 11 and 13 of the conduits 10 and 12 (FIGS. 37-38). In this manner, when the sealing door 358 is installed, a generally continuous, uninterrupted fluid flow surface 374 is provided from one conduit to the other.

In order to secure the conduits 10 and 12 to the coupling $CC_2$, conventional split-clamp assemblies 124 and 126 (FIGS. 20-22) may be provided.

It is noted herewith that the sealing doors 260 and 358, described above with respect to conduit couplings $CC_1$ and $CC_2$, respectively, may be replaced by other suitable adapters or attachments for other fluid communication functions, as desired.

The coupling C, sealing clip 58, sealing door 80, the diaphragm member 24, and the valve member 50 with valve handle 52, may all be made of a rigid material, such as hard plastic, metal, PVC, etc. It is preferable, however, that the coupling C shown in FIGS. 15-22 be made of cast iron or steel.

Likewise, the coupling $CC_1$, valve assembly 232, diaphragm 218, test and sealing doors 226 and 260, may also be made of a rigid material, such as hard plastic, metal, PVC, etc. However, it is preferred that the coupling $CC_2$ shown in FIGS. 31-38 be made of cast iron or steel.

Use and Operation

Referring now to FIGS. 2-6 and 8-11, when it is desired to test the leak integrity of a new pipe 12, the leak testing device LD of the present invention is provided such that the respective end portions 11 and 13 of the existing and new pipes 10 and 12, respectively, are slidably received in the end portions 6 and 8 of the body 14 and into the recess 16. Prior to positioning the end portions 11 and 13, a suitable adhesive, such as a PVC cement, is applied on the internal surface 138 of the body 14 and/or the outer surfaces 139 and 141 of the end portions 11 and 13, to provide a permanent seal between the end portions 6 and 8 of the body 14 and the end portions 11 and 13 of the pipes 10 and 12. As best shown in FIG. 8, the end portion 11 of the pipe 10 would sealingly engage the lower shoulder portion 20, while the end portion 13 of the pipe 12 would sealingly engage the upper shoulder portion 18. The diaphragm member 24 is then positioned in the recess 16 by inserting through the side opening 22 such that the front and rear end portions 28 and 30 are sealingly received between the upper and lower shoulder portions 18 and 20. The sealing clip 58 is then positioned in the side opening 22 such that the lip 70 thereof is snugly received between the lower surface 140 of the diaphragm member 24 and the surface 76 of the lower shoulder portion 20. The fasteners 68 are then positioned through the holes 64 in the sealing clip 58 to be received in the corresponding holes 66 in the tabs 36 and 38 to firmly secure the sealing clip 58 to the body 14 in a known manner. The valve handle 52 is then actuated to close the through hole 26 in the diaphragm member 24.

Upon assuring that the leak testing device LD is in proper fluid-tight engagement with the pipe end portions 11 and 13, the pipe 12 is then filled with a fluid and allowed to stand until the inspection for any leaks is completed. Upon completion of the inspection, the valve handle 52 is carefully and slowly pulled outwardly to allow gradual flow of fluid from the new pipe 12 into the existing pipe 10. Upon assuring that the pipe 12 is substantially empty of the fluid, the fasteners 68 are unscrewed and the sealing clip 58 is removed from the body 14. The diaphragm member 24 is pulled outwardly and removed from the body 14.

In order to connect the two pipes 10 and 12 in a fluid communication, the side opening 22 is sealed by inserting therethrough the sealing door 80. Prior to positioning the sealing door 80 in the side opening 22, however, a suitable adhesive, such as a PVC cement, may be applied on the upper and lower surfaces 142 and 144 of the sealing portion 84 thereof. The fasteners 68 are then threaded through the holes 96 to be screw-threaded in the corresponding holes 66 in the locking tabs 36 and 38 to permanently secure the sealing door 80 to the coupling C (FIG. 13).

The manner of installation and use of the embodiment shown in FIGS. 15-22, is similar as described above with reference to FIGS. 1-8 and 8-14. It would be appreciated, however, that the diaphragm member 24 would be inserted through the side opening 106 such that the front end portion 28 thereof is frictionally received in the trough 102 in a fluid-tight manner. The sealing clip 58 is then positioned in the same manner, as noted above. Once the inspection is completed, the diaphragm member 24 would be removed from the side opening 106 and the sealing door 108 positioned in the same manner, as described above. It is further noted, however, that since the end portions 11 and 13 of the pipes 10 and 12 generally correspond in diameter to the end portions 101 and 103 of the body 100, split-clamp assemblies 124 and 126 are used in a known manner to secure the coupling C between the pipes 10 and 12.

When using the leak testing device LD of the present invention adjacent a single conduit 130 (FIG. 7), it would be appreciated that while the end portion 128 of the conduit 130 would be permanently mounted to the body 14 by providing an adhesive therebetween, the mounting of the fluid discharge conduit 132 to the body 14 would not be permanent such that when the inspection is completed, the fluid discharge conduit 132 may be removed from the body 14 to be replaced by another pipe or conduit to connect it with the conduit 130 in a fluid communication. During testing, however, the fluid from the conduit 130 may be discharged through the garden hose 137 (or similar conduit) via discharge conduit 132.

The manner of installation and use of the embodiments shown in FIGS. 23-38, are similar to as described above with reference to FIGS. 1-22.

It can be observed from the above that the coupling C (or $CC_1$ or $CC_2$) of the present invention is mounted permanently between two adjacent conduits or pipes for testing purposes, however, it is left in place to connect the two conduits in a fluid communication subsequent to the testing. On the other hand, the diaphragm member 24 (or 218 or 320) with the valve assembly 46 (or 232 or 334), and the sealing clip 58 (or test doors 226 or 328) are removed after the testing and can be used to leak-test another conduit. Thus, the diaphragm and sealing clip (and the test doors) are reusable, while the coupling C (or $CC_1$ or $CC_2$) permanently connects two conduits in a fluid communication.

As can also be seen from the above, since the opening and closing of the valve assembly 46 (or 232 or 334), is done completely external of the pipes 10 and 12, and the fluid flows only between the pipes 10 and 12, the leak testing device LD of the present invention poses no danger to the personnel or the property involved. In addition, the operation of the leak testing device LD of the present invention does not require any additional equipment, such as a pneumatic pump or the like, and thus the entire procedure is straightforward, fast and significantly less complicated than the conventional devices. Finally, since the leak testing device LD of the present invention does not require the use of a T-fitting, significant savings in terms of time and expense are achieved.

While this invention has been described as having preferred sequences, ranges, steps, materials, structures, components, features, and/or designs, it is understood that it is capable of further modifications, uses and/or adaptations of the invention following in general the principle of the invention, and including such departures from the present disclosure as those come within the known or customary practice in the art to which the invention pertains, and as may be applied to the central features hereinbefore set forth, and fall within the scope of the invention and of the limits of the appended claims.

What is claimed is:

1. A coupling for connecting one or more conduits in a fluid communication, comprising:
   a) a generally cylindrical body defining a recess therein and including first and second end portions;
   b) one of said first and second end portions for cooperating with an end portion of a conduit;
   c) said body including a first opening between said first and second end portions for receiving a sealing door;
   d) said sealing door including a through hole having a diameter generally corresponding to the internal diameter of the end portion of the conduit; and
   e) a window for viewing the interior of said body.

2. The coupling of claim 1, wherein:
   a) said window comprises a generally clear material.

3. The coupling of claim 1, wherein:
   a) said sealing door comprises said window.

4. The coupling of claim 1, wherein:
   a) the first opening extends axially between said first and second end portions and includes a flared circumferential portion.

5. The coupling of claim 4, wherein:
   a) said body includes a second opening in communication with the first opening.

6. The coupling of claim 5, wherein:
   a) the second opening extends partially about the circumference of said body.

7. The coupling of claim 1, wherein:
   a) said body includes a tapered trough disposed generally opposite the first opening.

8. The coupling of claim 7, wherein:
   a) said sealing door includes an end portion to be received in said trough.

9. The coupling of claim 1, wherein:
   a) the internal diameter of one of said end portions is larger than the external diameter of the end portion of the conduit.

10. The coupling of claim 1, wherein:
    a) said first and second end portions for cooperating with the respective end portions of two conduits.

11. A leak testing kit for one or more conduits, comprising:
    a) a generally cylindrical body defining a recess therein and including first and second end portions;
    b) one of said first and second end portions for cooperating with an end portion of a conduit;
    c) said body including a first opening between said first and second end portions;
    d) a sealing door or a test door to be selectively positioned in the first opening;
    e) a diaphragm member to be positioned within said body;
    f) said diaphragm member including a through hole;
    g) a valve operably connected to said diaphragm member for selectively opening or closing the through hole to thereby permit or restrict the flow of a fluid therethrough;
    h) a window associated with said sealing door for viewing the interior of said body; and
    i) the first opening in said body receiving said diaphragm member and said test door when leak-testing a conduit, or said sealing door when connecting one or more conduits in a fluid communication.

12. The leak testing kit of claim 11, wherein:
    a) said window comprises a generally clear material.

13. The leak testing kit of claim 11, wherein:
a) said sealing door comprises said window.

14. The leak testing kit of claim 11, further comprising:
a) means associated with said test door for determining fluid pressure in said body.

15. The leak testing kit of claim 11, wherein:
a) said test door includes a second opening for determining fluid pressure in said body.

16. The leak testing kit of claim 11, wherein:
a) the first opening extends axially between said first and second end portions and includes a flared circumferential portion.

17. The leak testing kit of claim 16, wherein:
a) said body includes a second opening in communication with the first opening.

18. The leak testing kit of claim 17, wherein:
a) the second opening extends partially about the circumference of said body.

19. The leak testing kit of claim 11, wherein:
a) said body includes a tapered trough disposed generally opposite the first opening.

20. The leak testing kit of claim 19, wherein:
a) said sealing door includes an end portion to be received in said trough.

21. The leak testing kit of claim 11, wherein:
a) the internal diameter of one of said end portions is larger than the external diameter of the end portion of the conduit.

22. The leak testing kit of claim 11, wherein:
a) said first and second end portions for cooperating with the respective end portions of two conduits.

23. A coupling for connecting one or more conduits in a fluid communication, comprising:
a) a generally cylindrical body defining a recess therein and including first and second end portions;
b) one of said first and second end portions for cooperating with an end portion of a conduit;
c) said body including an opening between said first and second end portions;
d) a side extension defining a passageway therethrough in communication with the opening and a port opening to the exterior;
e) said body including a trough on the internal periphery thereof;
f) said trough extending on the internal periphery of said side extension; and
g) a sealing door for closing said port.

24. The coupling of claim 23, wherein:
a) said trough is tapered; and
b) a sealing member to be positioned in said trough.

25. The coupling of claim 24, wherein:
a) said sealing door and said sealing member are formed as one unit.

26. The coupling of claim 23, wherein:
a) the internal diameter of one of said end portions is generally the same as the internal diameter of the end portion of the conduit.

27. The coupling of claim 23, wherein:
a) said first and second end portions for cooperating with the respective end portions of two conduits.

28. A leak testing kit for one or more conduits, comprising:
a) a generally cylindrical body defining a recess therein and including first and second end portions;
b) one of said first and second end portions for cooperating with an end portion of a conduit;
c) said body including an opening between said first and second end portions;
d) a side extension defining a passageway therethrough in communication with the opening and a port opening to the exterior;
e) said body including a trough on the internal periphery thereof;
f) said trough extending on the internal periphery of said side extension;
g) a sealing door for closing the port;
h) a diaphragm member to be positioned within said body through the port;
i) said diaphragm member including a through hole;
j) a valve operably connected to said diaphragm member for selectively opening or closing the through hole to thereby permit or restrict the flow of a fluid therethrough; and
k) the port receiving said diaphragm member when leak-testing a conduit, or said sealing door when connecting one or more conduits in a fluid communication.

29. The leak testing kit of claim 28, wherein:
a) said diaphragm member includes an end portion to be received in a section of said trough.

30. The leak testing kit of claim 28, wherein:
a) the internal diameter of one of said end portions is generally the same as the internal diameter of the end portion of the conduit.

31. The leak testing kit of claim 28, wherein:
a) said first and second end portions for cooperating with the respective end portions of two conduits.

32. The leak testing kit of claim 28, further comprising:
a) means for determining fluid pressure in said body.

33. The leak testing kit of claim 28, further comprising:
a) a test door for closing the port when leak-testing a conduit; and
b) said test door including an opening for determining fluid pressure in said body.

34. A method of testing for a leak in a conduit, comprising:
a) providing a conduit to be leak-tested;
b) providing a leak testing kit adjacent an end portion of the conduit, wherein the leak testing kit comprises:
  i) a generally cylindrical body defining a recess therein and including first and second end portions;
  ii) one of the first and second end portions for cooperating with the end portion of the conduit;
  iii) the body including an opening between the first and second end portions;
  iv) a sealing door to be positioned in the opening;
  v) a diaphragm member to be positioned within the body;
  vi) the diaphragm member including a through hole;
  vii) a valve operably connected to the diaphragm member for selectively opening or closing the through hole to thereby permit or restrict the flow of a fluid therethrough;
  viii) a window associated with said sealing door for viewing the interior of the body; and
  ix) the opening in the body receiving the diaphragm member when leak-testing a conduit, or the sealing door when connecting one or more conduits in a fluid communication;
c) positioning the diaphragm in the recess through the opening;
d) actuating the valve to restrict the flow of fluid through the hole;
e) filling the conduit with a fluid;

f) inspecting the conduit for any leaks; and g) actuating the valve to permit the flow of fluid through the hole.

35. The method of claim 34, further comprising:

h) removing the diaphragm from the recess; and i) positioning the sealing door in the opening.

36. The method of claim 34, further comprising:

h) determining fluid pressure in the body after step e).

37. A method of testing for a leak in a conduit, comprising:

a) providing a conduit to be leak-tested;

b) providing a leak testing kit adjacent an end portion of the conduit, wherein the leak testing kit comprises:

i) a generally cylindrical body defining a recess therein and including first and second end portions;

ii) one of the first and second end portions for cooperating with the end portion of the conduit;

iii) the body including an opening between the first and second end portions;

iv) a side extension defining a passageway therethrough in communication with the opening and a port opening to the exterior;

v) the body including a trough on the internal periphery thereof;

vi) the trough extending on the internal periphery of the side extension;

vii) a sealing door for closing the port;

viii) a diaphragm member to be positioned within the body through the port;

ix) the diaphragm member including a through hole;

x) a valve operably connected to the diaphragm member for selectively opening or closing the through hole to thereby permit or restrict the flow of a fluid therethrough; and xi) the port receiving the diaphragm member when leak-testing a conduit, or the sealing door when connecting one or more conduits in a fluid communication;

c) positioning the diaphragm in the recess through the port;

d) actuating the valve to restrict the flow of fluid through the hole;

e) filling the conduit with a fluid;

f) inspecting the conduit for any leaks; and g) actuating the valve to permit the flow of fluid through the hole.

38. The method of claim 37, further comprising:

h) removing the diaphragm from the recess; and i) positioning the sealing door in the port.

39. The method of claim 37, further comprising:

h) determining fluid pressure in the body after step e).

* * * * *